US011896546B2

(12) United States Patent
von Schenck et al.

(10) Patent No.: US 11,896,546 B2
(45) Date of Patent: *Feb. 13, 2024

(54) CPR CHEST COMPRESSION SYSTEM WITH MOTOR POWERED BY BATTERY LOCATED AWAY FROM THE MOTOR

(71) Applicant: JOLIFE AB, Lund (SE)

(72) Inventors: Erik von Schenck, Lomma (SE); Anders Nilsson, Lund (SE); Sara Lindroth, Lund (SE); Gregory T. Kavounas, Bellevue, WA (US)

(73) Assignee: JOLIFE AB, Lund (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/959,150

(22) Filed: Oct. 3, 2022

(65) Prior Publication Data

US 2023/0023087 A1 Jan. 26, 2023

Related U.S. Application Data

(63) Continuation of application No. 16/667,488, filed on Oct. 29, 2019, now Pat. No. 11,478,402, which is a (Continued)

(51) Int. Cl.
*A61H 31/00* (2006.01)

(52) U.S. Cl.
CPC ..... *A61H 31/006* (2013.01); *A61H 2201/123* (2013.01); *A61H 2201/1207* (2013.01); *A61H 2205/084* (2013.01)

(58) Field of Classification Search
CPC .............. A61M 16/0048; A61M 31/00; A61M 31/008; A61M 31/004–007; A61M 31/02
See application file for complete search history.

(56) References Cited

U.S. PATENT DOCUMENTS

| | | | |
|---|---|---|---|
| 3,804,082 A | 4/1974 | Tarjan et al. |
| 4,060,079 A | 11/1977 | Reinhold, Jr. |

(Continued)

FOREIGN PATENT DOCUMENTS

| | | |
|---|---|---|
| CN | 102090973 A | 6/2011 |
| CN | 202654386 U | 1/2013 |

OTHER PUBLICATIONS

Annex to Form PCT/ISA/206, Communication Relating to Results of the Partial International Search, issued in International Application No. PCT/EP2016/082897, dated Apr. 4, 2017, 3 pages.

(Continued)

*Primary Examiner* — LaToya M Louis
(74) *Attorney, Agent, or Firm* — Miller Nash LLP

(57) ABSTRACT

A CPR chest compression system includes a retention structure that retains the body of a patient, and a motor and a compressor that can perform CPR compressions to the chest of the patient. The motor is powered by a battery that is located on the retention structure but away from the motor, and is electrically connected to the motor via one or more wires. Accordingly the weight and volume of the battery can be located away from a top portion of the retention structure. This renders the CPR system is less heavy at the top, and therefore less likely to tilt and start compressing the chest at a different point. Moreover, this permits X-Rays of a larger footprint to go through the CPR system and reach the patient, in example configurations where the components are transparent to X-Rays.

13 Claims, 15 Drawing Sheets

Related U.S. Application Data continuation of application No. 15/299,715, filed on Oct. 21, 2016, now Pat. No. 10,517,792.

(60) Provisional application No. 62/290,188, filed on Feb. 2, 2016.

(56) References Cited

U.S. PATENT DOCUMENTS

| | | | |
|---|---|---|---|
| 4,194,732 | A | 3/1980 | Liebman |
| 4,326,507 | A | 4/1982 | Barkalow |
| 5,490,820 | A | 2/1996 | Schock et al. |
| 5,640,078 | A | 6/1997 | Kou et al. |
| 5,741,305 | A | 4/1998 | Vincent et al. |
| 6,939,315 | B2 | 9/2005 | Sherman et al. |
| 7,569,021 | B2 | 8/2009 | Sebelius et al. |
| 8,763,610 | B2 | 7/2014 | Schmidt |
| 2004/0116840 | A1 | 6/2004 | Cantrell et al. |
| 2012/0116272 | A1 | 5/2012 | Hampton et al. |
| 2012/0203147 | A1 | 8/2012 | Lurie et al. |

OTHER PUBLICATIONS

International Search Report and Written Opinion of the International Searching Authority issued in International Application No. PCT/EP2016/082897, dated Jun. 13, 2017, 13 pages.

Physio-Control, Inc., LUCAS Chest Compression System, Product Brochure, May 2012.

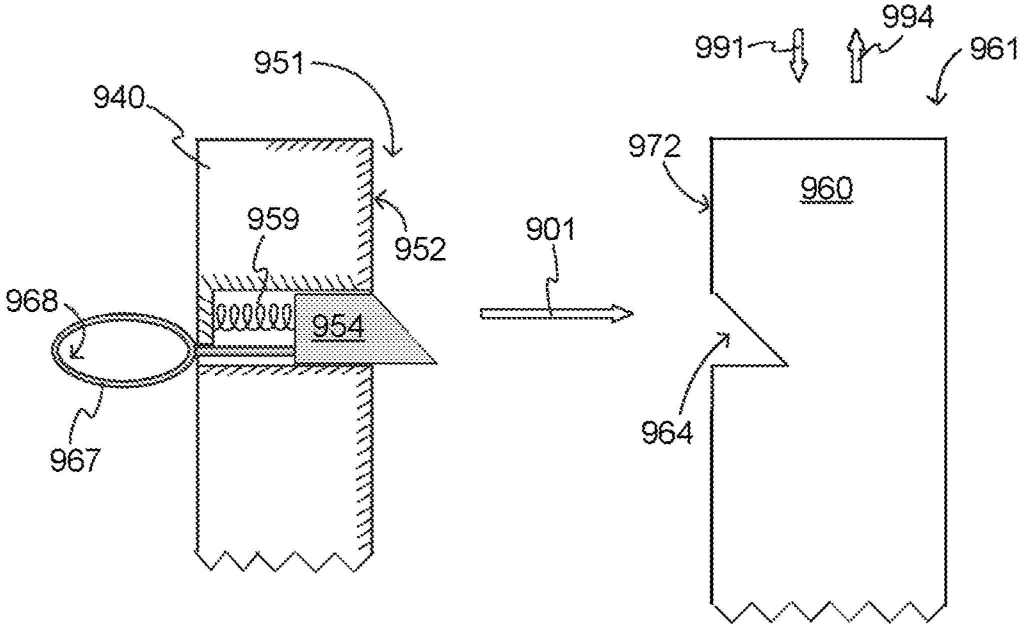

FIG. 9

1000

1010 INSERT BATTERY HOUSING INTO WELL BY SLIDING BATTERY HOUSING BY AT LEAST 1.5 CM INTO WELL DOWN TO THRESHOLD DEPTH, SO AS TO CAUSE INSTRUMENT LOCKING COMPONENT AND ACCESSORY LOCKING COMPONENT TO BECOME ENGAGED WITH EACH OTHER

1020 ACTUATE RELEASE HANDLE SO AS TO CAUSE THE THUS ENGAGED INSTRUMENT LOCKING COMPONENT AND ACCESSORY LOCKING COMPONENT TO BECOME DISENGAGED FROM EACH OTHER

FIG. 10

CPR CHEST COMPRESSION SYSTEM WITH MOTOR POWERED BY BATTERY LOCATED AWAY FROM THE MOTOR

CROSS-REFERENCES TO RELATED APPLICATIONS

This patent application is a continuation of application Ser. No. 16/667,488 filed Oct. 29, 2019, which is a continuation of U.S. patent application Ser. No. 15/299,715, filed on Oct. 21, 2016, which claims priority from U.S. Provisional Patent App. No. 62/290,188, filed on Feb. 2, 2016. Each of those applications is incorporated into the present disclosure by this reference.

BACKGROUND

In certain types of medical emergencies a patient's heart stops working, which stops the blood from flowing. Without the blood flowing, organs like the brain will start becoming damaged, and the patient will soon die. Cardiopulmonary resuscitation (CPR) can forestall these risks. CPR includes performing repeated chest compressions to the chest of the patient, so as to cause the patient's blood to circulate some. CPR also includes delivering rescue breaths to the patient, so as to create air circulation in the lungs. CPR is intended to merely forestall organ damage and death, until a more definitive treatment is made available. Defibrillation is one such a definitive treatment: it is an electric shock delivered deliberately to the patient's heart, in the hope of restoring the heart rhythm.

Guidelines by medical experts such as the American Heart Association provide parameters for CPR to cause the blood to circulate effectively. The parameters are for aspects such as the frequency of the chest compressions, the depth that they should reach, and the full release that is to follow each of them. If the patient is an adult, the depth is sometimes required to reach 5 cm (2 in.). The parameters for CPR may also include instructions for the rescue breaths.

Traditionally, CPR has been performed manually. A number of people have been trained in CPR, including some who are not in the medical professions, just in case they are bystanders in a medical emergency event.

Manual CPR may be ineffective, however. Indeed, the rescuer might not be able to recall their training, especially under the stress of the moment. And even the best trained rescuer can become fatigued from performing the chest compressions for a long time, at which point their performance may become degraded. In the end, chest compressions that are not frequent enough, not deep enough, or not followed by a full release may fail to maintain the blood circulation required to forestall organ damage and death.

The risk of ineffective chest compressions has been addressed with CPR chest compression machines. Such machines have been known by a number of names, for example CPR chest compression machines, CPR machines, mechanical CPR devices, cardiac compressors, CPR devices, CPR systems, and so on.

CPR chest compression machines typically hold the patient supine, which means lying on his or her back. Such machines then repeatedly compress and release the chest of the patient. In fact, they can be programmed to automatically follow the guidelines, by compressing and releasing at the recommended rate or frequency, while reaching a specific depth.

The repeated chest compressions of CPR are actually compressions alternating with releases. The compressions cause the chest to be compressed from its original shape. During the releases the chest is decompressing, which means that the chest is undergoing the process of returning to its original shape. This decompressing does not happen immediately upon a quick release. In fact, full decompression might not be attained by the time the next compression is performed. In addition, the chest may start collapsing due to the repeated compressions, which means that it might not fully return to its original height, even if it were given ample opportunity to do so.

Some CPR chest compression machines compress the chest by a piston. Some may even have a suction cup at the end of the piston, with which these machines lift the chest at least during the releases. This lifting may actively assist the chest, in decompressing the chest faster than the chest would accomplish by itself. This type of lifting is sometimes called active decompression.

Active decompression may improve air circulation in the patient, which is a component of CPR. The improved air circulation may be especially critical, given that the chest could be collapsing due to the repeated compressions, and would thus be unable by itself to intake the necessary air.

SUMMARY OF THE DISCLOSURE

The present description gives instances of Cardio-Pulmonary Resuscitation (CPR) chest compression systems and methods, the use of which may help overcome problems and limitations of the prior art.

In embodiments, a CPR chest compression system includes a retention structure that retains the body of a patient, and a motor and a compressor that can perform CPR compressions to the chest of the patient. The CPR chest compression system is powered by a battery that can be replaced by the rescuer. The retention structure has a well, and a rescuer can slide a battery into the well. The inserted battery becomes locked in the well until the rescuer actuates a release handle.

An advantage is that a CPR chest compression system retains a patient, and is powered by battery that can be replaced while the patient continues to be retained. As such, a battery of the CPR system can be replaced without needing to pause for a significant time duration, which is useful in case a medical emergency event for a single patient lasts for a long time. One or more batteries can be replaced in the field, which further relaxes the design requirement that a single battery be used that has enough charge for operation during a prolonged event.

In embodiments, a CPR chest compression system includes a retention structure that retains the body of a patient, and a motor and a compressor that can perform CPR compressions to the chest of the patient. The CPR chest compression system's motor is powered by a battery that is located away from the motor, and is electrically connected to the motor via one or more wires.

An advantage over the prior art is that the weight and volume of the battery can be located away from a top portion of the retention structure. This renders the CPR system is less heavy at the top, and therefore less likely to tilt and start compressing the chest at a different point. Moreover, this permits X-Rays of a larger footprint to go through the CPR system and reach the patient, in embodiments where the components are transparent to X-Rays.

In embodiments, a CPR chest compression system includes a retention structure that retains the body of a patient, and a motor and a compressor that can perform CPR compressions to the chest of the patient. The CPR chest compression system is powered by two or more batteries. The CPR system includes a receiving circuit between the batteries and the motor. In embodiments, the receiving circuit is smart and permits one of the batteries to be used preferentially over the other. The battery that is used is drained faster. In embodiments, a battery that already has less charge can be drained preferentially.

An advantage over the prior art is that a rescuer then needs to recharge only one depleted battery, at a time when the CPR system is using the better-charged battery that it has preserved.

These and other features and advantages of the disclosed technology will become more readily apparent in view of the embodiments described and illustrated in the present disclosure, namely from the present written specification and the drawings.

BRIEF DESCRIPTION OF THE DRAWINGS

FIG. 9 is a diagram showing a detail of a sample instrument locking component and a complementary sample accessory locking component of a CPR system that are made according to other embodiments, and which are shown artificially separated for clarity.

FIG. 10 is a flowchart for illustrating methods according to embodiments.

DETAILED DESCRIPTION

Figure 1A:
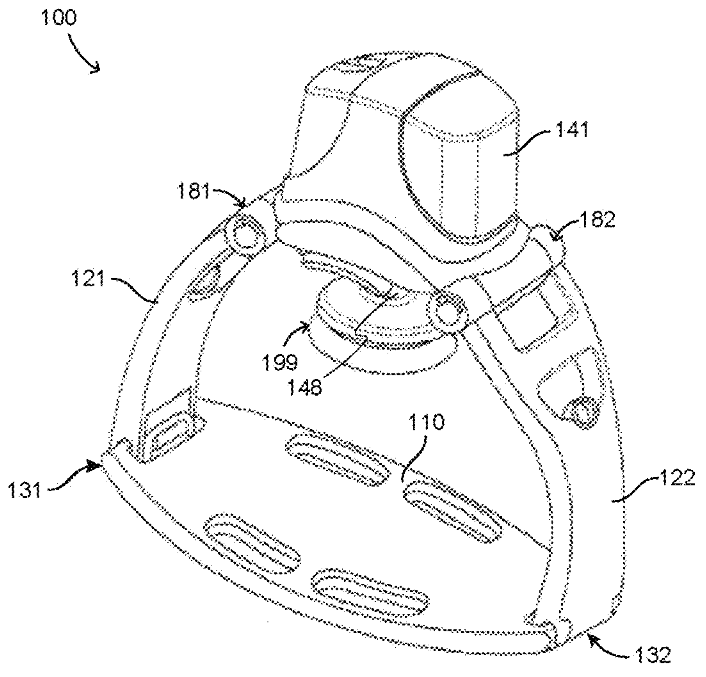
FIG. 1A (PRIOR ART)
FIG. 1A is a perspective diagram of a conventional CPR system.
Figure 1B:
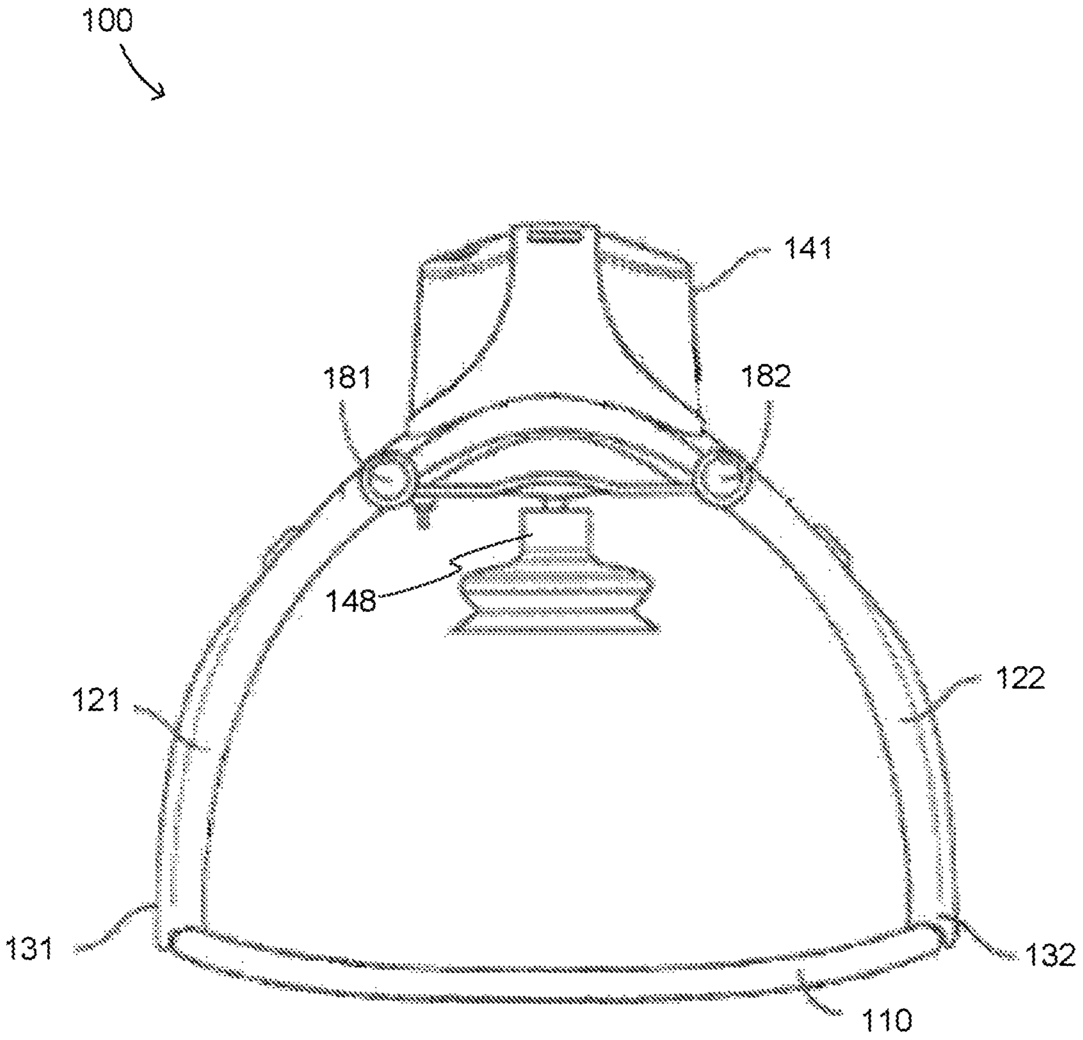
FIG. 1B (PRIOR ART)
FIG. 1B is a diagram showing an elevation view of the CPR system of FIG. 1A.

As has been mentioned, the present description is about Cardio-Pulmonary Resuscitation (CPR) systems that are usable by a rescuer to care for a patient. A conventional such system is now described with reference to FIGS. 1A and 1B, which is presently being sold by Physio-Control under the trademark Lucas®.

A CPR system 100 includes components that form a retention structure. The components include a central member 141, a first leg 121, a second leg 122 and a back plate 110. Central member 141 is coupled with first leg 121 and second leg 122 using joints 181, 182, such that first leg 121 and second leg 122 can be partly rotated around joints 181, 182 with respect to central member 141. This rotation can help minimize the overall volume of CPR system 100, for easier storage at times when it is not used. In addition, the far ends of legs 121, 122 can become coupled with edges 131, 132 of back plate 110.

These couplings form the retention structure that retains the patient. In this particular case, central member 141, first leg 121, second leg 122 and back plate 110 form a closed loop, in which the patient is retained. For storage, back plate 110 can be uncoupled from legs 121, 122, which can be further rotated so that their edges are brought closer to each other.

Central member 141 includes a battery that stores energy, a motor that receives the energy from the battery, and a compression mechanism that can be driven by the motor. The compression mechanism is driven up and down by the motor using a rack and pinion gear. The compression mechanism includes a piston 148 that can compress and release the patient's chest. Here, piston 148 terminates in a suction cup 199 for active decompression. In this case the battery, the motor and the rack and pinion gear are not shown, because they are completely within a housing of central member 141.

Figure 2A:
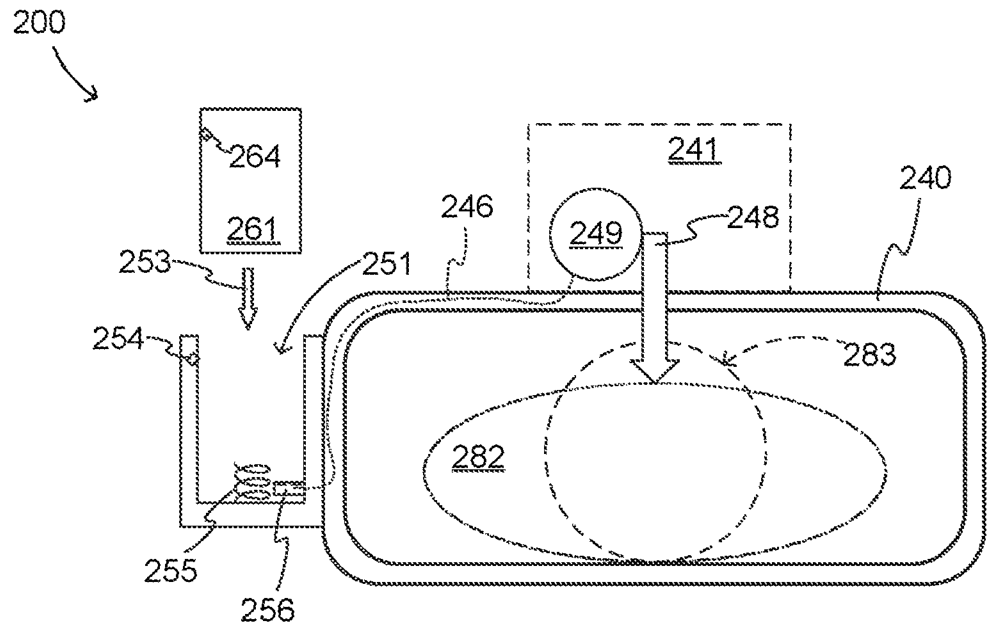
FIG. 2A is a partly conceptual diagram of sample components of a CPR system made according to embodiments that have a well, and where a battery block has not yet been inserted into a well.
Figure 2B:
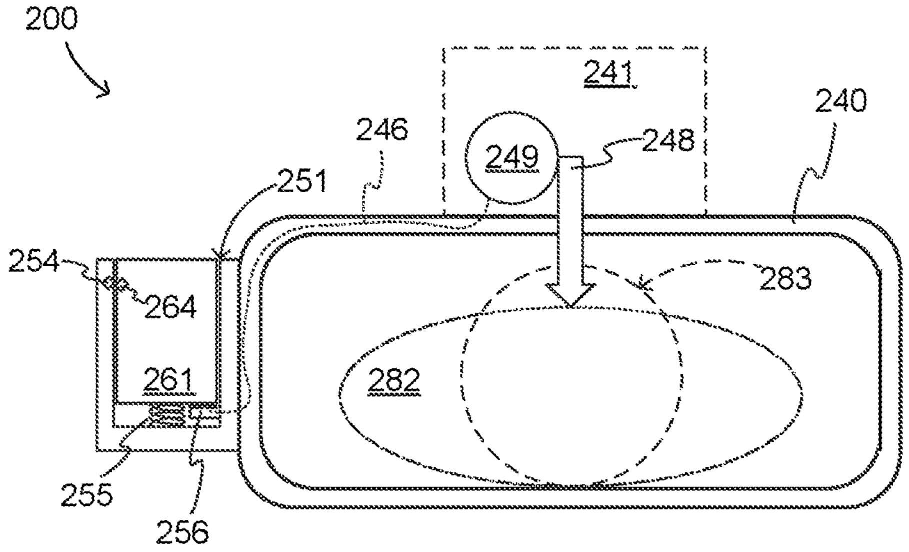
FIG. 2B is the diagram of FIG. 2A, and where the battery block has been inserted into the well.

Embodiments are now described in more detail. FIGS. 2A & 2B are partly conceptual, in that some elements are depicted substantially accurately while other elements substantially conceptually, as will be understood by a person skilled in the art.

In one or more implementations, as shown in FIG. 2A, a Cardio-Pulmonary Resuscitation (CPR) system 200 is provided. CPR system 200 is a chest compression system, usable to care for a patient 282. CPR system 200 is usable by a rescuer (not shown) to care for patient 282. As will be appreciated, the rescuer will thus place patient 282 in CPR system 200, and turn on CPR system 200. Head 283 of patient 282 is shown for perspective. Afterwards, CPR system 200 may operate automatically and largely autonomously, while the rescuer is observing, making adjustments, performing other tasks, or making logistical arrangements for transport and subsequent care of patient 282.

CPR system 200 includes a retention structure 240 that is configured to retain a body of patient 282. Retention structure 240 may be implemented in a number of ways. In some embodiments, retention structure 240 includes the earlier described components, sometimes with modifications. One such modification can be that one of the legs is missing. In some embodiments, retention structure 240 includes a backboard. Some embodiments are described later in this document.

CPR system 200 also includes a motor 249 that is coupled to retention structure 240. In this example, motor 249 is provided in an optional housing 241 that is located generally above patient 282, while patient 282 is retained by retention structure 240.

CPR system 200 additionally includes a compression mechanism 248. As shown conceptually in FIG. 2A, compression mechanism 248 could include a piston such as piston 148 of FIG. 1A. In this example, at least some of compression mechanism 248 is shown within optional housing 241.

Other configurations are also possible. For example, the retention structure could include a backboard, and the compression mechanism could include a belt wrapped around the chest of patient 282. In such a case, motor 249 could be located generally at a location other than above patient 282. Of course, the implementation of compression mechanism 248 is preferably done in consideration of the implementation of retention structure 240. For example, in some embodiments, compression mechanism 448 is a piston that emerges from a housing that is placed against the patient's chest. In such embodiments, retention structure 440 can include a belt with two ends attached to the housing. The belt is also wrapped around the back of the patient. Batteries can be inserted in the housing as described below.

This description presents details about batteries of CPR systems. It is necessary for this description to sometimes distinguish between a) the cell that stores the electrical energy, and b) the battery housing that contains the cell. As will be seen in this description, a battery housing according to embodiments may have properties that permit easier handling by the rescuer. Accordingly, to maintain the distinction between the cell and the battery housing, the term "battery block" is used in this document as necessary. Where the distinction is not important, the simpler term "battery" may be used. In addition, it is anticipated that rescuers will use the simpler term "battery" for the object they are replacing, recharging, and so on.

CPR system 200 additionally includes a battery block 261. Battery block 261 has a battery housing and a cell within the battery housing that is configured to store energy, neither of which are indicated separately in FIG. 2A due to scale. Detailed sample embodiments of battery block 261 are now described.

Figure 3:
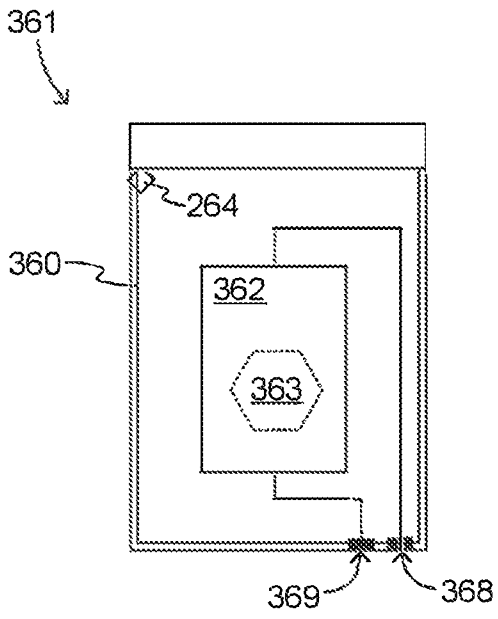
FIG. 3 is a partly conceptual diagram of a sample battery block made according to embodiments, and which could also be the battery block of the embodiments of FIG. 2A and FIG. 2B.

FIG. 3 shows a sample battery block 361 that could also be battery block 261. Battery block 361 has a battery housing 360 and a cell 362 within battery housing 360. Cell 362 is configured to store energy 363 in ways that are well known in the art. Moreover, battery housing 360 has electrical contacts 368, 369. Within battery housing 360, wires make electrical connections between cell 362 and electrical contacts 368, 369.

In the example of FIG. 3, battery block 361 also has an accessory locking component 264, whose implementation and function will be understood in view of the below similarly named and numbered component of FIG. 2A.

Returning to FIG. 2A, battery block 261 also has an accessory locking component 264. Moreover, retention structure 240 has a well 251, and an instrument locking component 254 that is associated with well 251. Well 251 can be formed as part of retention structure 240, or in any of its components, as described later in this document.

In some embodiments, battery block 261 is configured to be inserted into well 251. This configuration may be implemented by making the battery housing of battery block 261 have a shape substantially complementary to well 251. In embodiments, therefore, the battery housing of battery block 261 is configured to be inserted into well 251. Inserting can be performed by the rescuer sliding the battery housing into well 251, according to the direction of an arrow 253. Such sliding within the well can be by at least 1.5 cm in depth or even deeper, depending on the component sizes.

In FIG. 2A battery block 261 has not yet been inserted into well 251 according to arrow 253. FIG. 2B shows where the battery block has been so inserted. In embodiments, CPR system 200 further includes an ejection spring 255, and optionally also a stop 256. Detailed sample embodiments are now described.

Figure 4:
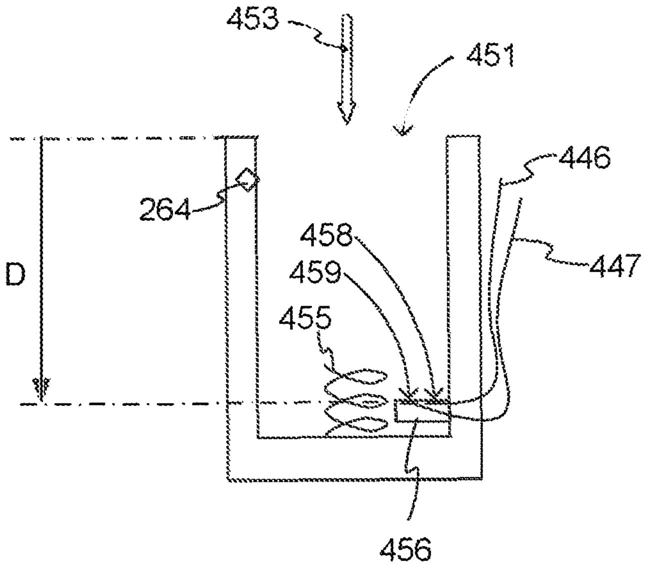
FIG. 4 is a diagram showing sample details of a well of a CPR system made according to embodiments, and which could also be the well of the embodiments of FIG. 2A and FIG. 2B.

Referring briefly to FIG. 4, a sample well 451 is shown with an ejection spring 455 and a stop 456, all of which could be similar to those of FIG. 2A. A battery block (not shown in FIG. 4 but shown in FIG. 3) may be inserted in well 451 according to a direction 453. Ejection spring 455 is positioned relative to well 451 such that ejection spring 455 becomes compressed when the battery housing of the battery block has been thus inserted into well 451 down to a threshold depth D.

Moreover, in this embodiment, stop 456 is at about the threshold depth D, and defines the desired end of the travel of the battery housing being inserted into well 451. In particular, stop 456 may prevent the battery housing being inserted any deeper into the well. Based on the above, threshold depth D could be deeper than the above mentioned 1.5 cm.

In this embodiment, stop 456 includes electrical contacts 459, 458 within well 451. These electrical contacts 459, 458 could become electrically coupled to contacts 369, 368 when the battery housing has been fully inserted into well 451. Accordingly, energy 363 could be received from battery block 361 via wires 447, 446 that are coupled to electrical contacts 459, 458. In other embodiments, the electrical contacts are provided within the well, but at a side wall of the well, etc.

Returning again to FIG. 2B, battery block 261 has been inserted into well 251 until it has reached stop 256, and ejection spring 255 has become compressed. In equivalent embodiments, an ejection spring could have been extended, etc.

In FIGS. 2A, 2B, 3 and 4, instrument locking component 254 and accessory locking component 264 are shown mostly conceptually. Implementations for instrument locking component 254 and accessory locking component 264 are described later in this document. Still, as shown, when the battery housing is inserted into well 251 down to the threshold depth, accessory locking component 264 is brought close to instrument locking component 254. In embodiments, instrument locking component 254 can become interlocked with accessory locking component 264, so as to lock battery block 261 within well 251. This locking would prevent battery block 261 from partially sliding out or completely falling out of well 251. In other words, instrument locking component 254 of well 251 and accessory locking component 264 of the battery housing of battery block 261 are such that, thus inserting the battery housing into well 251 down to the threshold depth permits instrument locking component 254 and accessory locking component 264 to become engaged with each other. Engagement can effectuate locking, such that the thus inserted battery housing can no longer slide out of well 251, even if a force of 50 Newton (Nt) were to be applied to the battery housing against retention structure 240.

Motor 249 is configured to receive the stored energy from the cell of battery block 261, while the battery housing of battery block 261 has been thus inserted into well 251. If well 251 has been placed close to motor 249, the stored energy can be received over a short distance, perhaps over a node. Else wires may be used, for example as later described in this document for battery wire 1146. A sample optional battery wire 246 is shown.

Compression mechanism 248 can be configured to be driven by motor 249, while motor 249 thus receives energy. Compression mechanism 248 can be configured to perform, while thus driven and the patient's body is retained by retention structure 240, automatically CPR compressions alternating with releases to a chest of the patient's body. The CPR compressions may thus cause the chest to become compressed by at least 2.5 cm.

In embodiments, one of the instrument locking component and the accessory locking components includes a release handle. Examples of such a release handle are described later in this document, for example with reference to at least FIGS. 7-9. In such embodiments, when the release handle is actuated by the rescuer, the thus engaged instrument locking component 254 and accessory locking component 264 become disengaged from each other, such that the battery housing can again slide out of well 251 if a force of 50 Nt were to be applied to the battery housing against retention structure 240.

Moreover if, as is preferred, ejection spring 255 is indeed provided, then the ejection spring may eject at least partially the battery housing from well 251, responsive to the release handle being thus actuated.

An advantage of embodiments is that a rescuer can replace a depleted battery with a freshly charged one rather easily and quickly. Such embodiments are easy to teach to medical personnel who would use CPR system 200.

Regarding the location of well 251 relative to retention structure 240, there are many possibilities. In embodiments, retention structure 240 and well 251 are configured such that the rescuer can slide the battery housing of battery block 261 into well 251 while retention structure 240 thus retains the body of patient 282. In other words, a mouth of well 251, and its main depth direction, can be oriented such that they are accessible by the rescuer during the medical emergency event, and without the retained patient's body presenting an obstruction.

An advantage, therefore, is that the rescuer can replenish a battery by interrupting the chest compressions for only a short time, and without having to move the patient. In fact, batteries can be made smaller, if they can be changed during a single such event.

In some embodiments, retention structure 240 includes a central member, a first leg, a second leg and a back plate. The central member can be configured to become coupled to the back plate via the first leg and the second leg. This could be as in FIG. 1A, where the back plate can be totally separated from the other three components. Or, these components may be capable of being coupled together and separable in different combinations, for example using hinges or not, etc. In such embodiments, the well is in one of the legs, such as in the first leg. An example is now described.

Figure 5:
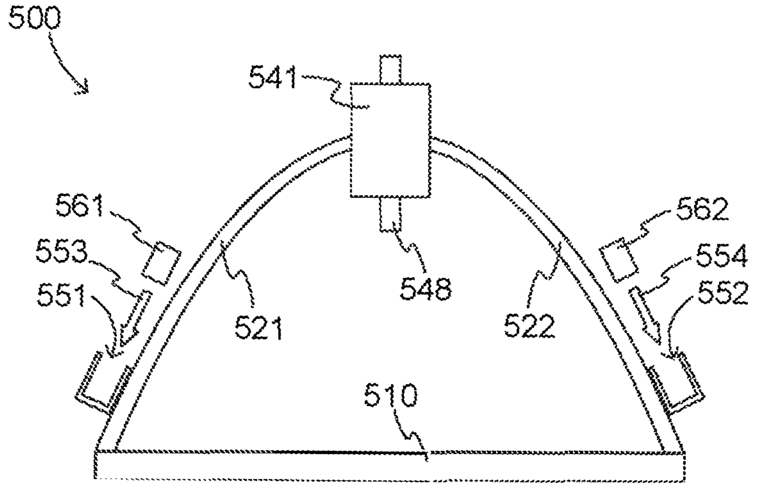
FIG. 5 is an elevation diagram of a sample CPR system made according to embodiments.

FIG. 5 is an elevation diagram of a sample CPR system 500 made according to embodiments. CPR system 500 includes a central member 541, a first leg 521, a second leg 522 and a back plate 510. A compression mechanism 548 can be coupled to central member 541. Central member 541 can be configured to become coupled to back plate 510 via first leg 521 and second leg 522.

First leg 521 has a well 551. A battery block 561, made as described above, can be inserted into well 551, according to arrow 553. In embodiments where the patient's arms are tied to legs 521, 522, then well 551 can be formed such that its main direction is titled somewhat from the vertical, so that its interior can be accessed the arms of the patient presenting an obstruction.

In the particular example of FIG. 5, CPR system 500 actually has two wells and two battery blocks, optionally symmetrically. In particular, second leg 522 includes an other well 552, and CPR system 500 further includes an other battery block 562 that has an other battery housing and an other cell within the other battery housing. The other cell can be configured to store energy, of course. The other battery housing of other battery block 562 can be configured to be inserted into other well 552 by the rescuer sliding the other battery housing into other well 552, for example as per the direction of arrow 554. Powering the single motor by two battery blocks 561, 562 can be coordinated in a number of ways, including optionally using a receiving circuit as described later in this document.

In some embodiments, the well is in the back plate. Examples are now described.

Figure 6:
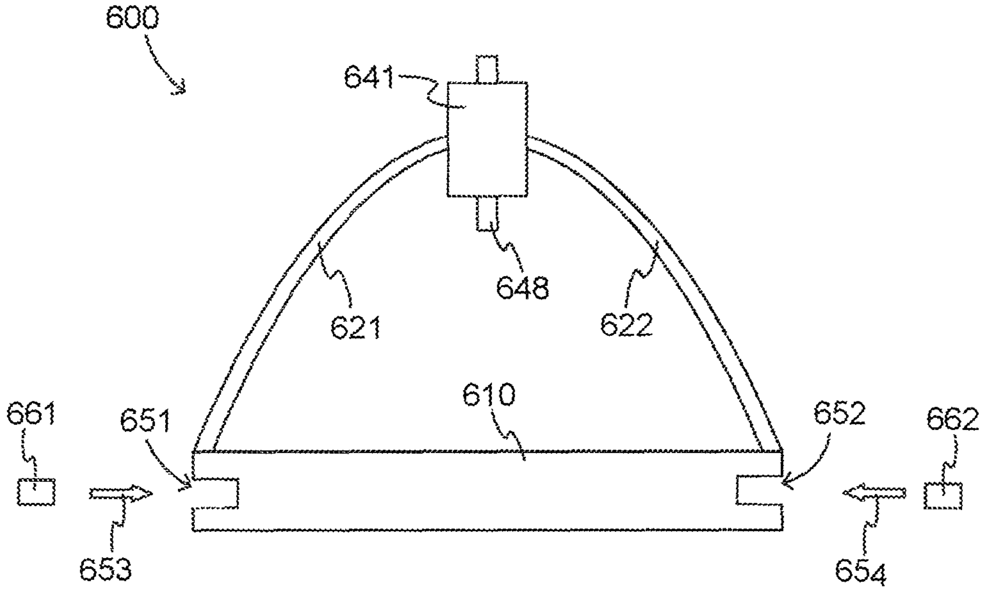
FIG. 6 is an elevation diagram of a sample CPR system made according to embodiments.

FIG. 6 is an elevation diagram of a sample CPR system 600 made according to embodiments. CPR system 600 includes a central member 641, a first leg 621, a second leg 622 and a back plate 610. A compression mechanism 648 can be coupled to central member 641. Central member 641 can be configured to become coupled to back plate 610 via first leg 621 and second leg 622.

Back plate 610 has a well 651. A battery block 661, made as described above, can be inserted into well 651, according to arrow 653.

In the particular example of FIG. 6, CPR system 600 actually has two wells and two battery blocks, optionally symmetrically. In particular, back plate 610 also has an other well 652, and CPR system 600 further includes an other battery block 662 that has an other battery housing and an other cell within the other battery housing. The other cell can be configured to store energy. The other battery housing of other battery block 662 can be configured to be inserted into other well 652 by the rescuer sliding the other battery housing into other well 652, for example as per the direction of arrow 654. Powering the motor by two battery blocks 661,

662 can be coordinated in a number of ways, including optionally using a receiving circuit as described later in this document.

In embodiments such as those of FIGS. 5 and 6, the battery block may be located away from the motor. In such embodiments, the energy may be transferred from the battery block to the motor by wires, as is described later in this document.

Returning again to FIGS. 2A & 2B, examples are given for instrument locking component 254 and accessory locking component 264, for describing how they can lock battery block 261 within well 251.

Figure 7:
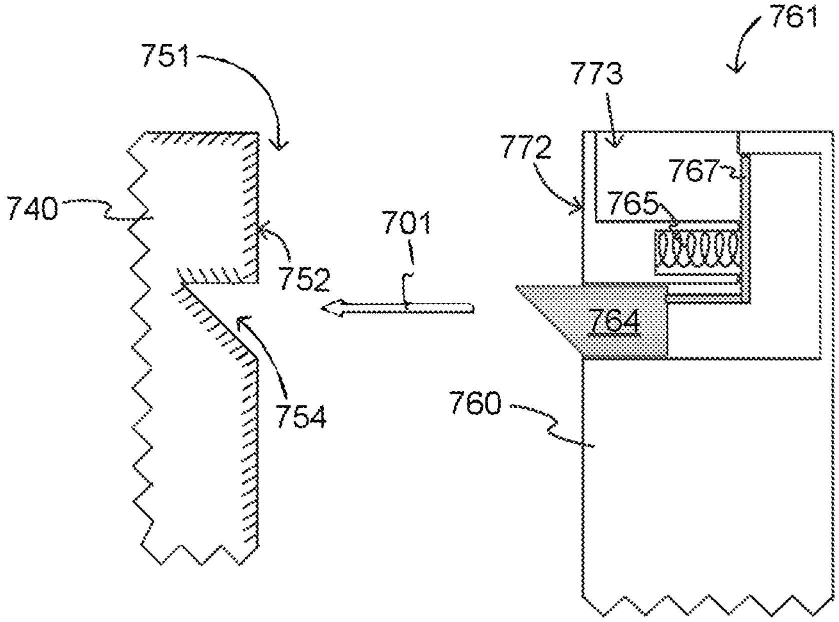
FIG. 7 is a diagram showing a detail of a sample instrument locking component and a complementary sample accessory locking component of a CPR system that are made according to embodiments, and which are shown artificially separated for clarity.

FIG. 7 is a diagram showing a detail of a sample instrument locking component and a complementary sample accessory locking component of a CPR system that are made according to embodiments, and which are shown artificially separated for clarity. In particular, a portion of a retention structure 740 has a well 751, of which only the left half is shown. The left half of well 751 includes an inner surface 752.

Moreover, a battery block 761 according to embodiments has a battery housing 760 with an outer surface 772. Ordinarily the rescuer slides battery block 761 in well 751 such that outer surface 772 of battery housing 760 moves in parallel with, and very near inner surface 752. In FIG. 7, however, outer surface 772 is shown artificially separated from inner surface 752, for clarity.

In the embodiment of FIG. 7 the instrument locking component of well 751 includes a slot 754 in inner surface 752. In particular, well 751 has a main depth direction that is downwards in FIG. 7, and also in FIG. 8A. This direction is shown by arrow 891 in FIG. 8, and is the direction in which battery block 761 is inserted in well 751. Slot 754 has a depth in a direction perpendicular to the main depth direction of well 751. In other words, slot 754 has a depth in a horizontal direction, also shown by arrow 701.

In the embodiment of FIG. 7 the accessory locking component of battery block 761 includes an anchor 764 that is configured to protrude from outer surface 772 of battery housing 760. In fact, in this embodiment, the accessory locking component further includes an anchor spring 765 that is configured to bias anchor 764 towards thus protruding, as is preferred.

This way, when anchor 764 protrudes from outer surface 772, it is configured to become received in slot 754, as battery housing 760 is thus inserted into well 751 down to the threshold depth. The protruding and the receiving are shown artificially by arrow 701.

In embodiments, the receiving of anchor 764 in slot 754 may cause the instrument locking component and the accessory locking component to become thus engaged with each other. This would prevent battery block 761 from accidentally sliding out of well 751, in a direction upward in FIG. 7.

The aforementioned release handle can be part of either the instrument locking component or the accessory locking component. In the embodiment of FIG. 7, it is the accessory locking component that includes a release handle 767. Actuating release handle 767 can be performed by pushing it to the right, in FIG. 7. Actuating release handle 767 may withdraw anchor 764 from thus protruding. The withdrawing, therefore, may cause anchor 764 to no longer be thus received in slot 754. If, as is preferred, anchor spring 765 is included, thus actuating release handle 767 can be performed by applying force against anchor spring 765.

Figure 8A:
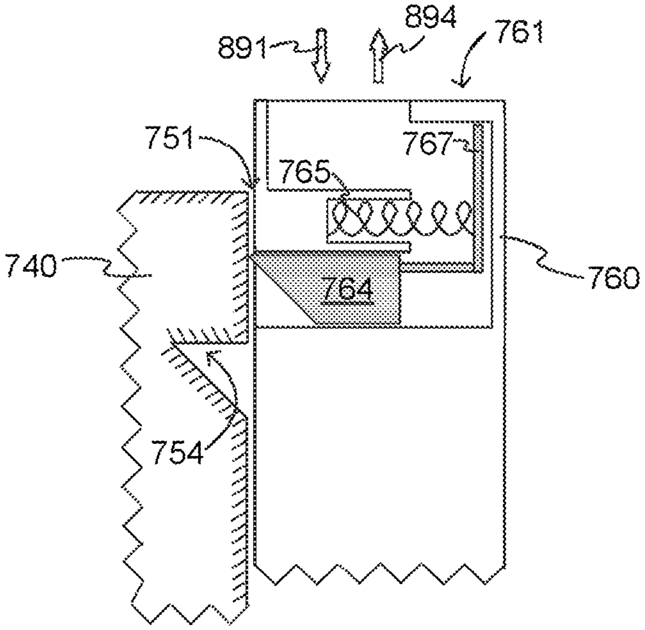
FIGS. 8A-8C are diagrams of successive sample configurations of the components of FIG. 7, as they may become engaged and disengaged when operated by a rescuer according to embodiments.
Figure 8B:
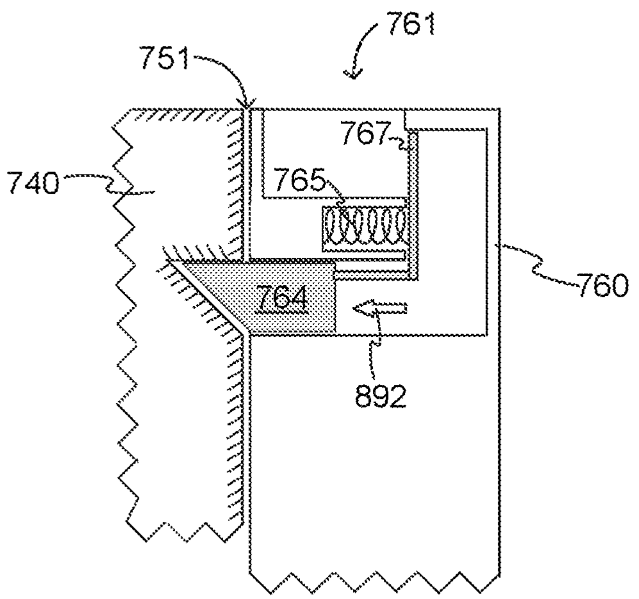
Figure 8C:
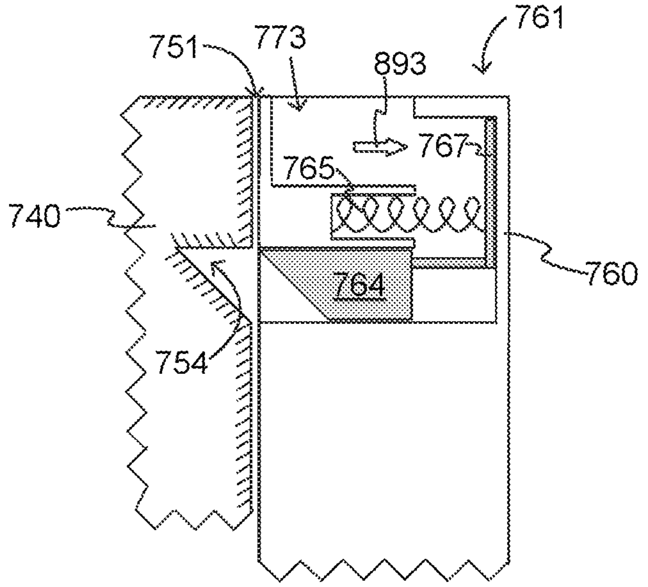

FIGS. 8A-8C are diagrams of successive sample configurations of the components of FIG. 7, as they may become engaged and disengaged when operated by a rescuer according to embodiments. Not all reference numerals are repeated from FIG. 7, to preserve clarity.

In FIG. 8A, the rescuer is inserting battery block 761 into well 751 according to the direction of arrow 891. Outer surface 772 of battery housing 760 is sliding near inner surface 752. Anchor 764 is withdrawn within battery housing 760, and substantially not protruding; actually it may protrude a little within the short space of outer surface 772 and inner surface 752, but it is still not received within slot 754. Anchor spring 765 is extended, and biases anchor 764 towards inner surface 752.

In FIG. 8B, battery block 761 has reached the threshold depth within well 751. Anchor 764 has been aligned with slot 754, and anchor spring 765 has thus pushed anchor 764 to be received in slot 754 according to an arrow 892. This locks battery block 761 within well 751. Anchor spring 765 is no longer extended.

In FIG. 8C, release handle 767 is being actuated by being pushed to the right, in the direction of arrow 893. Anchor spring 765 is again extended, and anchor 764 has been withdrawn from slot 754. The rescuer can then pull battery block 761 out of well 751 with relatively little force, often less than 50 Nt, in the direction of arrow 894 against retention structure 740.

In this embodiment, the rescuer may access release handle 767 by inserting a few fingers via an opening 773 in housing 760. It will be appreciated that this design, which makes release handle 767 relatively difficult to access, does not permit many scenarios of release handle 767 becoming actuated accidentally, e.g. by being bumped.

In the example just described, the accessory locking component had the anchor. Equivalently, the anchor can be in the instrument locking component. An example is now described.

FIG. 9 is a diagram showing a detail of a sample instrument locking component and a complementary sample accessory locking component of a CPR system that are made according to other embodiments, and which are shown artificially separated for clarity. In particular, a portion of a retention structure 940 has a well 951, of which only the left half is shown. The left half of well 951 includes an inner surface 952.

Moreover, a battery block 961 according to embodiments has a battery housing 960 that includes an outer surface 972. Ordinarily the rescuer slides battery block 961 in well 951 such that outer surface 972 of housing 960 moves in parallel with, and near inner surface 952. In FIG. 9, however, battery housing 960 is shown artificially separated from inner surface 952 for clarity.

Moreover, the instrument locking component of well 951 includes an anchor 954 that is configured to protrude into well 951 from inner surface 952 of well 951. In fact, in this embodiment, the instrument locking component further includes an anchor spring 959 that is configured to bias anchor 954 towards thus protruding, as is preferred.

In the embodiment of FIG. 9 the accessory locking component of battery block 961 includes a slot 964 in outer surface 972. This way, when anchor 954 protrudes from outer surface 952, it is configured to become received in slot 964, as battery housing 960 is thus inserted into well 951 down to the threshold depth in the direction of arrow 991. The protruding and the receiving are shown artificially by arrow 901.

In embodiments, the receiving of anchor 954 in slot 964 may cause the instrument locking component and the accessory locking component to become thus engaged with each other. This would prevent battery block 961 from accidentally sliding out of well 951 in the direction of arrow 994.

The aforementioned release handle can be part of either the instrument locking component or the accessory locking component. In the embodiment of FIG. 9, it is the instrument locking component that includes a release handle 967. Actuating release handle 967 can be performed by pulling it to the right, in FIG. 9, for example by inserting a finger through a loop 968 of release handle 967. Actuating release handle 967 may withdraw anchor 954 from thus protruding. The withdrawing, therefore, may cause anchor 954 to no longer be thus received in slot 964. If, as is preferred, anchor spring 959 is included, thus actuating release handle 967 can be performed by applying force against anchor spring 959.

Other embodiments are also possible. For example, one may consult U.S. Pat. No. 5,741,305 from a different art, and which is incorporated by reference in this document.

The disclosed technology also includes methods. FIG. 10 shows a flowchart 1000 for describing methods according to embodiments. According to an operation 1010, a battery housing is inserted into a well of a retention structure by sliding the battery housing by at least 1.5 cm into the well down to a threshold depth. In some embodiments the threshold depth is longer, e.g. 3 cm, 5 cm or even longer. Inserting may thus cause an instrument locking component and an accessory locking component to become engaged with each other. The engagement can be such that the thus inserted battery housing can no longer slide out of the well, even if a force of 50 Nt were to be applied to the battery housing against a retention structure that has the well.

In embodiments, responsive to operation 1010 a motor becomes able to receive stored energy from a cell in the battery housing, and to drive a compression mechanism while the battery housing has been thus inserted into the well.

According to another, optional operation, prior to operation 1010 a body of a patient can be placed in the retention structure, so that the retention structure retains the body. In such a case, the battery housing can be inserted into the well according to operation 1010 while the retention structure thus retains the body.

In some embodiments where a CPR system further includes an ejection spring, inserting the battery housing into the well according to operation 1010 requires applying force against the ejection spring.

In some embodiments, one of the instrument locking component of the well and the accessory locking component of the battery block includes a release handle. In such embodiments, according to another, optional operation 1020, the release handle is actuated so as to cause the thus engaged instrument locking component and accessory locking component to become disengaged from each other. The disengagement can be such that the battery housing can again slide out of the well if a force of 50 Nt were to be applied to the battery housing against the retention structure.

In embodiments where an ejection spring is provided, the ejection spring may eject at least partially the battery housing from the well responsive to operation 1020.

In some embodiments, one of the instrument locking component and the accessory locking component includes an anchor, a release handle and an anchor spring. In such embodiments, thus actuating the release handle as described in operation 1020 is performed by applying force against the anchor spring.

Figure 11:
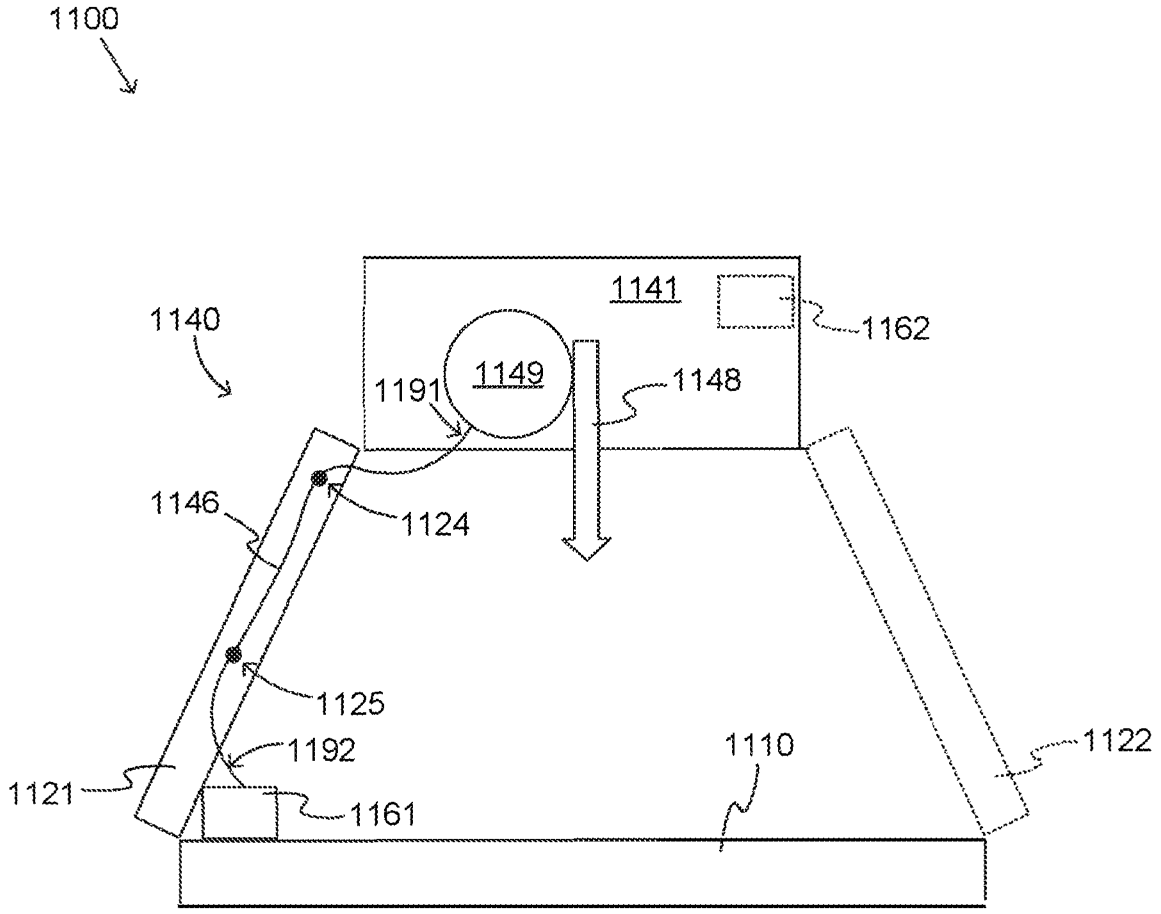
FIG. 11 is a partly conceptual diagram of sample components of a CPR system made according to additional embodiments.

FIG. 11 is a partly conceptual diagram of sample components of a CPR system 1100 made according to additional embodiments. CPR system 1100 is usable by a rescuer (not shown) to care for a patient (not shown).

CPR system 1100 includes a retention structure 1140. Retention structure 1140 includes a central member 1141, a leg 1121 and a back plate 1110. Central member 1141 can be configured to become coupled to back plate 1110 via leg 1121. Retention structure 1140 can be configured to retain a body of a patient, when central member 1141 is thus coupled to back plate 1110.

In some embodiments, retention structure 1140 further optionally includes an other leg 1122, which can be also called a second leg 1122. In such embodiments, central member 1141 can be configured to become coupled to back plate 1110 via also second leg 1122. In such a case, retention structure 1140 can form a closed loop around the chest of the patient, although this is not required.

As also mentioned above, central member 1141 can be configured to become thus coupled to back plate 1110 in a number of ways. In some embodiments, all components can be wholly separable from each other. In some embodiments, legs 1121 & 1122 can be rotatably coupled with central member 1141, and wholly separable from back plate 1110. In some embodiments, central member 1141 can slide down leg 1121 by an adjustable distance, and so on.

CPR system 1100 also includes a motor 1149 attached to central member 1141. In some embodiments, central member 1141 outwardly looks like a housing that completely encloses motor 1149. In addition, CPR system 1100 may also include a compression mechanism 1148 that is attached to central member 1141 and is configured to be driven by motor 1149. What is written above for motor 249 and compression mechanism 248 may also apply to motor 1149 and compression mechanism 1148, respectively.

In embodiments, at least a first battery block 1161 can be configured to be supported by retention structure 1140. There are a number of different ways for battery block 1161 to be supported by retention structure 1140 that are described later in this document, and any one of them is implied by how battery block 1161 is conceptual depicted in FIG. 11.

Battery block 1161 can be configured to store energy, for delivering to motor 1149. For this, battery block 1161 can become electrically coupled to motor 1149 as follows: CPR system 1100 also includes a battery wire 1146 having a first end 1191 that is electrically coupled to motor 1149. Battery wire 1146 also has a second end 1192 opposite first end 1191. Battery block 1161 can be configured to become electrically coupled to second end 1192 of battery wire 1146 when central member 1141 is thus coupled to back plate 1110. In such cases, then, motor 1149 can be configured to receive energy from battery block 1161 via battery wire 1146 when central member 1141 is thus coupled.

Battery wire 1146 further has a length of at least 6 cm between first end 1191 and second end 1192. In fact, battery wire 1146 could be a lot longer. A supported portion of battery wire 1146 that is least 4 cm long can be supported by leg 1121. In FIG. 11, the supported portion is defined at least between support points 1124, 1125, at which battery wire 1146 is supported by leg 1121. Points 1124, 1125 are at least 4 cm away from each other, and could potentially be a lot farther, even up to the whole length of leg 1121. The supported portion can be at a surface of leg 1121, within it, and so on.

Of course, while only a single battery wire 1146 is being described, this is only for the purpose of simplicity. Another battery wire (not shown) may accommodate the second electrical pole of the cell of battery block 1161, i.e. the opposite polarity or complementary polarity or reference voltage of the cell.

In some embodiments, battery wire 1146 may have a flexible portion. An example is now described.

Figure 12:
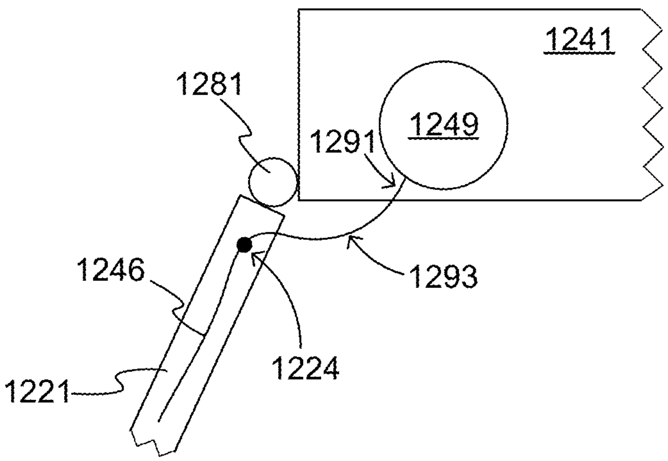
FIG. 12 is a partly conceptual diagram of sample components of a CPR system made according to embodiments, and in a larger scale than those in FIG. 11, so as to show a possible detail according to an embodiment.

FIG. 12 is a partly conceptual diagram of sample components of a CPR system made according to embodiments, and in a larger scale than those in FIG. 11, so as to show a possible detail according to an embodiment.

In FIG. 12, components include a central member 1241 to which a motor 1249 is attached. Leg 1221 is coupled to central member 1241 by using a joint 1281. Accordingly, leg 1221 can be rotated with respect to central member 1241 around joint 1281. A battery wire 1246 has a first end 1291 that is electrically coupled to motor 1249, and has a supported portion that is supported by leg 1221 at a point 1224. Battery wire 1246 includes a flexible portion 1293 between first end 1291 and point 1224. Flexible portion 1293 is distinct from the supported portion, and is supported by neither central member 1241 nor leg 1221. Accordingly, flexible portion 1293 may flex as leg 1221 is rotated with respect to central member 1241.

As already mentioned with reference to FIG. 11, battery block 1161 can be configured to be supported by any component of retention structure 1140. Of course, as before, the battery block has a battery housing and a cell within the battery housing that is configured to store the energy. The supporting is done from the battery housing. Different embodiments are now described.

In some embodiments, the battery block is configured to be supported by a leg of the retention structure, such as the leg. In particular, the battery block has a battery housing that can be configured to be supported by the leg of the retention structure. Examples are now described.

Figure 13:
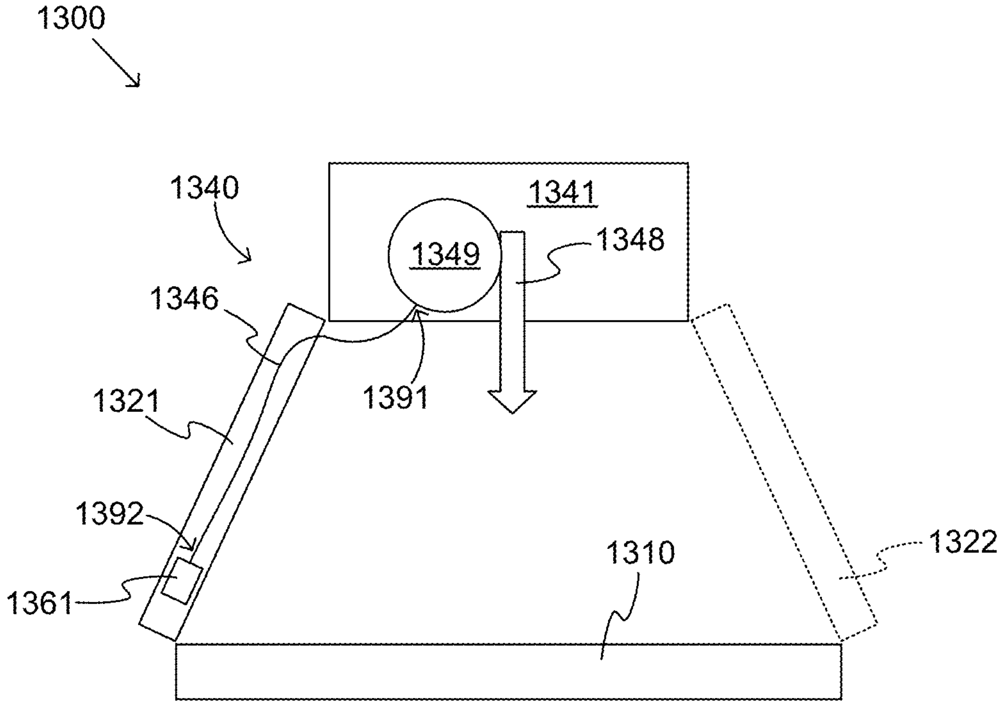
FIG. 13 is a partly conceptual diagram of sample components of a CPR system made according to embodiments, and further showing a more particular embodiment in which the battery block of FIG. 11 is supported at or in one of the legs of the retention structure.

FIG. 13 is a partly conceptual diagram of sample components of a CPR system 1300 made according to additional embodiments. CPR system 1300 is usable by a rescuer (not shown) to care for a patient (not shown).

CPR system 1300 includes a retention structure 1340. Retention structure 1340 includes a central member 1341, a leg 1321 and a back plate 1310. Central member 1341 can be configured to become coupled to back plate 1310 via leg 1321, for example as described above with reference to FIG. 11. Retention structure 1340 can be configured to retain a body of a patient, when central member 1341 is thus coupled to back plate 1310.

In some embodiments, retention structure 1340 further optionally includes a second leg 1322. In such embodiments, central member 1341 can be configured to become coupled to back plate 1310 via also second leg 1322. In such a case, retention structure 1340 can form a closed loop around the chest of the patient, although this is not required.

CPR system 1300 also includes a motor 1349 attached to central member 1341. In some embodiments, central member 1341 outwardly looks like a housing that completely encloses motor 1349. In addition, CPR system 1300 may also include a compression mechanism 1348 that is attached to central member 1341 and is configured to be driven by motor 1349. What is written above for motor 249 and compression mechanism 248 may also apply to motor 1349 and compression mechanism 1348, respectively.

At least a first battery block 1361 can be configured to be supported by leg 1321 of retention structure 1340, by appropriately shaping the battery housing of battery block 1361 and leg 1321, for example by making them complementary in form. A battery wire 1346 is similar to what was described for battery wire 1146. In particular, battery wire 1346 has a first end 1391 that is electrically coupled to motor 1349, and a second end 1392 that can become electrically coupled to the cell of battery block 1361. Battery wire 1346 further has a length of at least 6 cm between first end 1391 and second end 1392, and is potentially a lot longer. A supported portion of battery wire 1346 that is least 4 cm long can be supported by leg 1321, similarly with what was described in FIG. 11.

Again, while only a single battery wire 1346 is being described, this is only for the purpose of simplicity. Another wire (not shown) may accommodate the second electrical pole of the cell of battery block 1361.

The battery housing of battery block 1361 and leg 1321 can be complementarily shaped in a number of ways. For example, leg 1321 may have a small compartment, even with a door, in which battery block 1361 can be placed. For another example, as already described with reference to corresponding elements in FIG. 5, leg 1321 can have a well into which the battery housing of battery block 1361 can slide and become secured by an instrument locking component becoming engaged with an accessory locking component, and so on. And, of course, two battery blocks can be supported if two legs are provided, and so on.

In some embodiments, the battery block is configured to be supported by the back plate of the retention structure. In particular, the battery block has a battery housing that can be configured to be supported by the back plate. Examples of how the battery block can be supported in the back plate have already been described with reference to FIG. 6, where the back plate can have a well into which the battery housing of battery block and become secured by an instrument locking component becoming engaged with an accessory locking component, and so on. In other embodiments, the back plate may have a small compartment, even with a door, in which the battery block can be placed. And, of course, two battery blocks can be supported at the two legs, and so on.

For the electrical contacts, electrical coupling can be made when edges are brought together. Examples are now described.

Figure 14A:
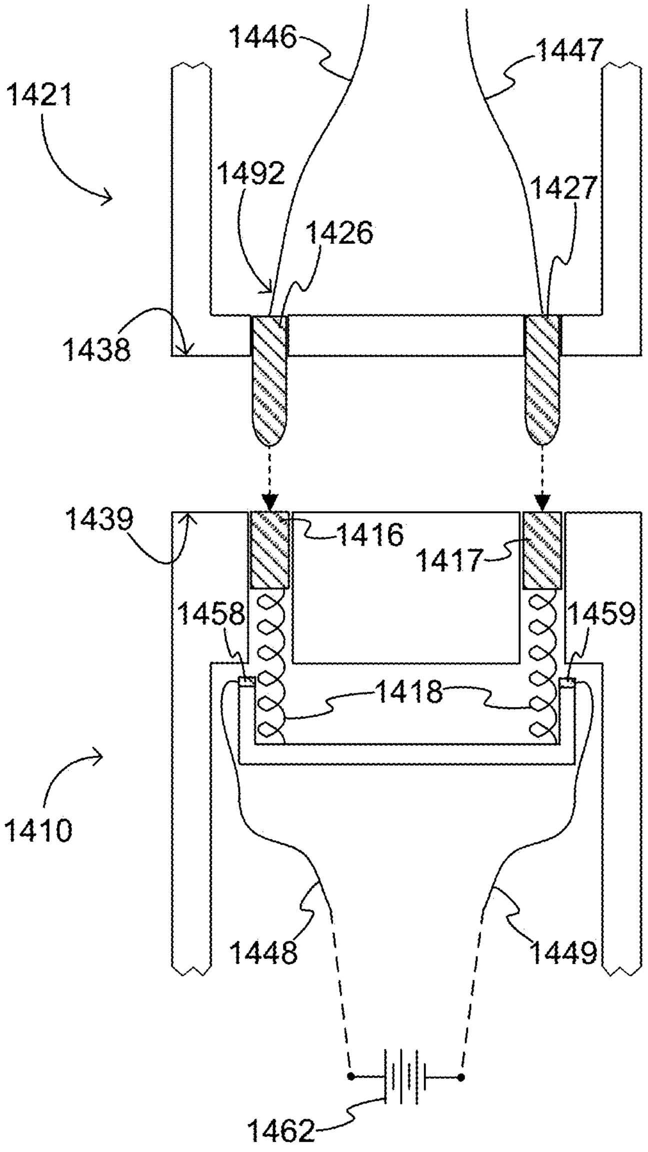
FIG. 14A is a partly conceptual diagram of sample mechanical and electrical details of a leg and a back plate of a CPR system at a time when they are apart, and made according to embodiments in which the back plate supports a battery block.
Figure 14B:
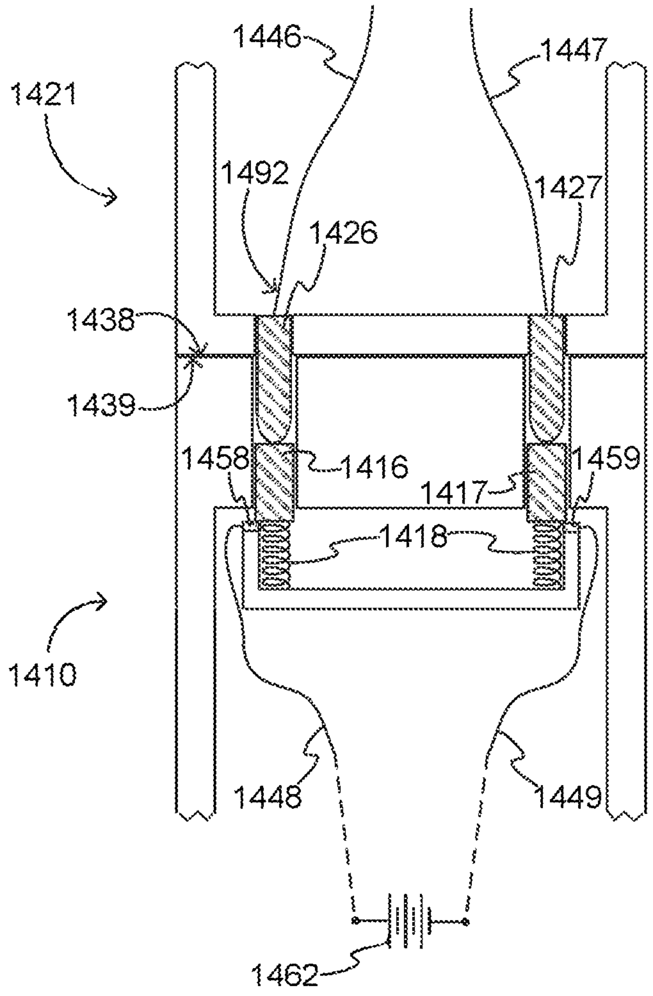
FIG. 14B is the partly conceptual diagram of FIG. 14A, in which further the back plate and the leg have been brought together.

FIGS. 14A & 14B are diagrams of sample mechanical and electrical details of a leg 1421 and a back plate 1410 of a CPR system. In FIG. 14A they are apart, for example as seen by their separated edges 1438, 1439, while in FIG. 14B leg 1421 and a back plate 1410 have been brought together. When a central member of a CPR system (not shown) becomes coupled to back plate 1410 through leg 1421, leg 1421 is brought together with a back plate 1410 at edges 1438, 1439. At that time, edges 1438, 1439 are brought very close to, or even in contact with each other.

Leg 1421 has a leg electrical contact 1426. A battery wire 1446, similar to battery wire 1146, has a first end (not shown) electrically coupled to the motor (not shown) and a second end 1492 that is electrically coupled to leg electrical contact 1426. In addition, an other battery wire 1447 is used for the opposite polarity. Other battery wire 1447 is electrically coupled between the motor (not shown) and an other leg electrical contact 1427. In this example, leg electrical contacts 1426, 1427 protrude from edge 1438.

In FIGS. 14A & 14B, the battery block is configured to be supported by back plate 1410. In these partly conceptual diagrams, only the electrical schematic of a cell 1462 of the battery block is shown, to illustrate the electrical connections. In addition, two wires 1448, 1449 have first ends that are electrically coupled to the poles of cell 1462, and second ends that are electrically coupled to intermediate contacts 1458, 1459 near edge 1439.

Moreover, back plate 1410 has back plate electrical contacts 1416, 1417 that correspond to leg electrical contacts 1426, 1427. In this example, back plate electrical contacts 1416, 1417 do not protrude from edge 1439. Back plate electrical contacts 1416, 1417 are moveable within their sockets, and can be brought into contact with touch intermediate contacts 1458, 1459. Accordingly, the battery block, i.e. cell 1462, is configured to become electrically coupled to back plate electrical contacts 1416, 1417 when supported in back plate 1410.

Referring to FIG. 14B, when leg 1421 is brought together with a back plate 1410 at edges 1438, 1439, back plate electrical contacts 1416, 1417 become electrically coupled with leg electrical contacts 1426, 1427. In addition, at that time back plate electrical contacts 1416, 1417 can touch intermediate contacts 1458, 1459, and therefore the power of cell 1462 becomes available to battery wires 1446, 1447.

In this example, leg electrical contacts 1426, 1427 are fixed, while back plate electrical contacts 1416, 1417 are moveable. In fact, back plate electrical contacts 1416, 1417 are supported by contact springs 1418. Contact springs 1418 become compressed when leg 1421 and a back plate 1410 are brought together. In an equivalent embodiment, the contact springs could be in the side of the leg, not the back plate.

In some embodiments where two batteries are used, a receiving circuit may be also used. For such embodiments, it should be remembered that the terms battery and battery block may be used interchangeably in some circumstances, as per the above. Examples are now described.

Figure 15:
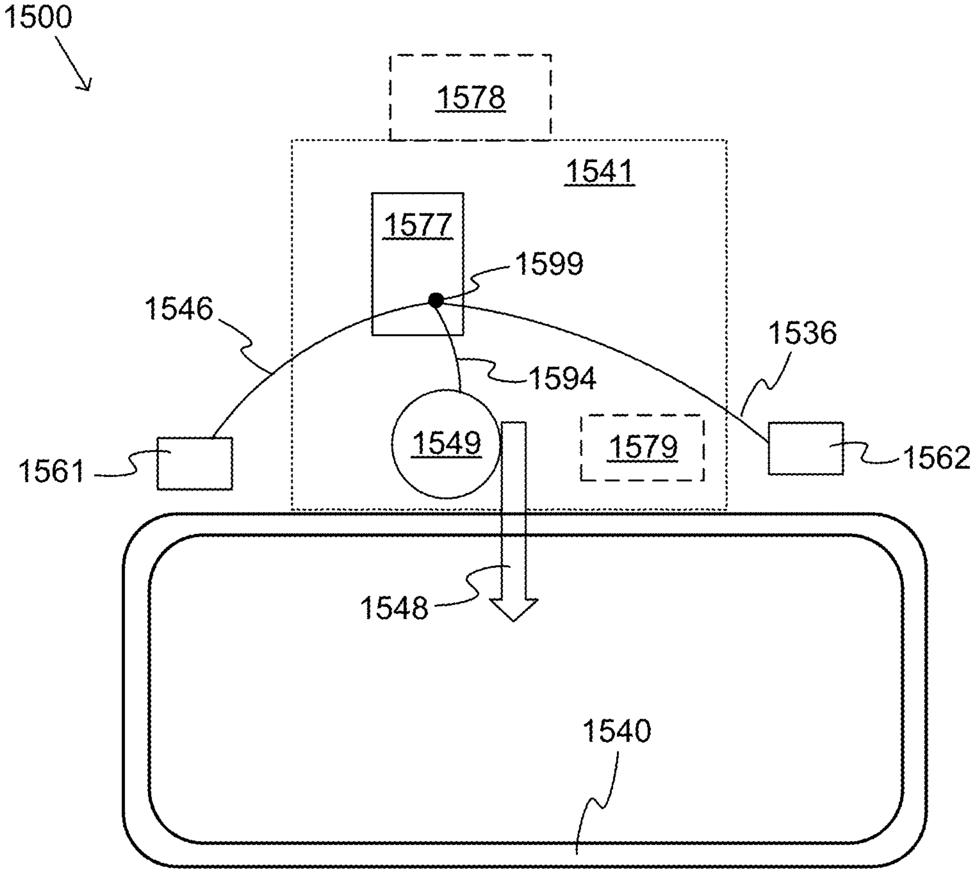
FIG. 15 is a partly conceptual diagram of sample components of a CPR system, made according to embodiments that include two batteries and a receiving circuit.

FIG. 15 is a partly conceptual diagram of sample components of a CPR system 1500, which is made according to embodiments that include two batteries 1561, 1562 and a receiving circuit 1577. CPR system 1500 is usable by a rescuer (not shown) to care for a patient (not shown).

CPR system 1500 includes a retention structure 1540 that is configured to retain a body of a patient. While shown only conceptually in FIG. 15, retention structure 1540 may be implemented in a number of ways, for example as described for retention structures earlier in this document.

CPR system 1500 also includes a motor 1549 that is coupled to retention structure 1540. In this example, motor 1549 is provided in an optional housing 1541. CPR system 1500 additionally includes a compression mechanism 1548. As shown conceptually in FIG. 15, compression mechanism 1548 could be a piston such as piston 148 of FIG. 1A. In the example of FIG. 15, at least some of compression mechanism 1548 is shown within optional housing 1541.

CPR system 1500 additionally includes a first battery 1561 and a second battery 1562. Batteries 1561, 1562 can be configured to store energy, and to be coupled to retention structure 1540. Batteries 1561, 1562 can be located near motor 1549, for example within housing 1541 if provided. Or, batteries 1561, 1562 can be supported by legs of retention structure 1540, for example as seen in FIG. 5 of this document for battery blocks 561, 562 being supported by legs 521, 522. Or, batteries 1561, 1562 can be supported by a back plate of retention structure 1540, for example as seen in FIG. 6 of this document for battery blocks 661, 662 being supported by back plate 610.

CPR system 1500 moreover includes a receiving circuit 1577 that can be supported on retention structure 1540, and preferably within optional housing 1541. Receiving circuit 1577 has a central node 1599, and possibly also other components.

Central node 1599 can be electrically coupled to first battery 1561 and second battery 1562. This electrical coupling can be via optional wires such as battery wires 1546, 1536, plus their respective complementary wires for the opposite polarities. If batteries 1561, 1562 are located near motor 1549, then battery wires 1546, 1536 could be very short. If, however, batteries 1561, 1562 are located farther away, then battery wires 1546, 1536 could be commensurately longer.

Motor 1549 can be electrically coupled to central node 1599, for example via a wire 1594. Depending on embodiments, wire 1594 can be a mere electrical node, i.e. central node 1599.

Embodiments of receiving circuit 1577 can be such that motor 1549 can be configured to receive energy via central node 1599 from first battery 1561, or second battery 1562, or both first battery 1561 and second battery 1562. Examples are now described.

In some embodiments, receiving circuit 1577 is only central node 1599, as shown in FIG. 15. In such embodiments, motor 1549 can be receiving from both batteries 1561 & 1562. A person skilled in the art will recognize, however, that in this embodiment, if batteries 1561, 1562 are not equally charged, then the stronger battery could be also charging the weaker one through central node 1599.

Figure 16:
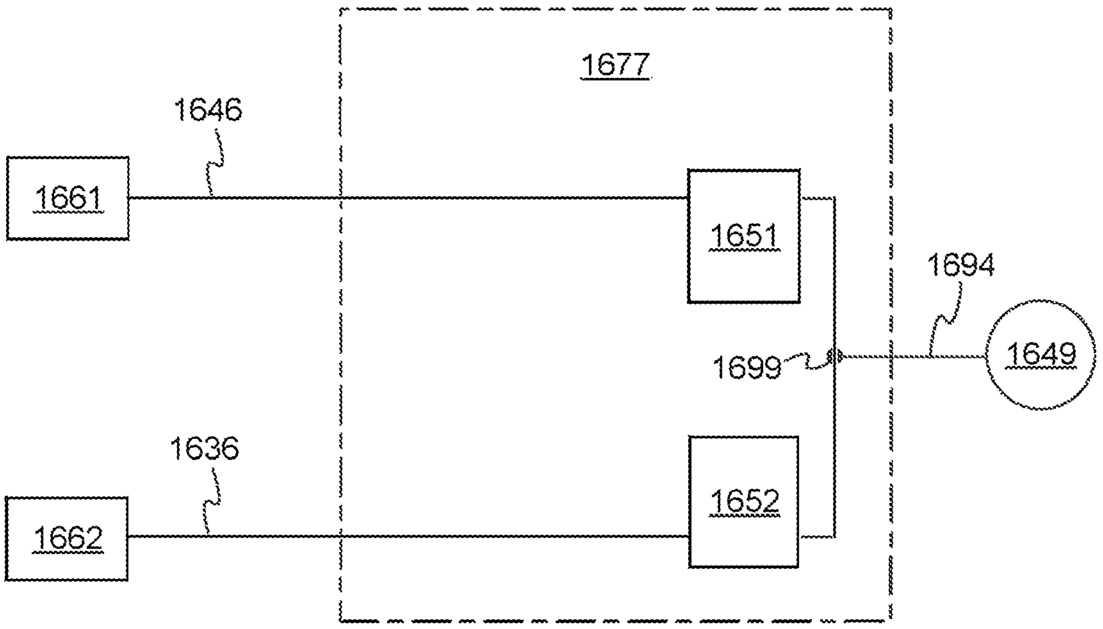
FIG. 16 is a block diagram of sample components for implementing a receiving circuit such as the receiving circuit of FIG. 15 according to embodiments.

FIG. 16 is a block diagram of sample components for implementing a receiving circuit 1677. Receiving circuit 1677 includes a central node 1699 that is coupled to motor 1649 via a wire 1694. Moreover, receiving circuit 1677 includes stopping circuits 1651, 1652 so as to prevent the stronger one of batteries 1661, 1662 from charging the weaker one via central node 1699. In particular, central node 1699 is electrically coupled to a first battery 1661 via a battery wire 1646 and a first stopping circuit 1651. Central node 1699 is also electrically coupled to a second battery 1662 via a battery wire 1636 and a second stopping circuit 1652.

Each of stopping circuits 1651, 1652 can be configured to prevent one of first battery 1651 and second battery 1652 from adding charge to the other via central node 1699. Stopping circuits 1651, 1652 could be made of diodes. A challenge with diodes, however, is that they render the charge they pass through at a lower voltage than they receive it.

Returning to FIG. 15, in some embodiments, receiving circuit 1577 is configured to select one of first battery 1561 and second battery 1562 over the other. This selection is also known as arbitration. In such embodiments, receiving circuit 1577 can be configured to permit motor 1549 to thus receive energy from the selected one of first battery 1561 and second battery 1562 preferentially over the other.

In some embodiments, receiving circuit 1577 is configured to thus permit motor 1549 to receive energy from the selected one of first battery 1561 and second battery 1562, by prohibiting motor 1549 from receiving energy from the one of first battery 1561 and second battery 1562 that was not selected. This prohibiting may be implemented in a number of ways. For example, is some embodiments, receiving circuit 1577 also includes a switching circuit that is configured to disconnect from central node 1599 the one of first battery 1561 and second battery 1562 that was not selected. Such switching circuits are described later in this document.

In some embodiments, CPR system 1500 further includes a user interface 1578. User interface 1578 can be configured to output a human-perceptible indication, such as a sound or an image or a light. The human-perceptible indication may indicate which one of first battery 1561 and second battery 1562 is thus selected.

Receiving circuit 1577 may select one batteries 1561, 1562 over the other in a number of ways. Examples are now described.

Figure 18:
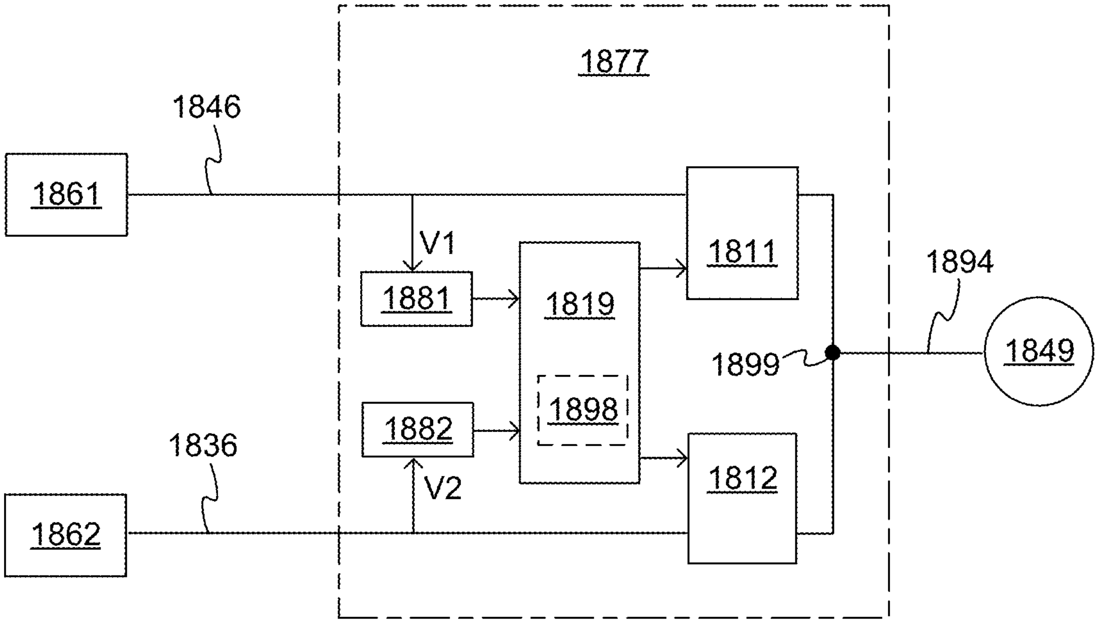
FIG. 18 is a block diagram of sample components for implementing a receiving circuit such as the receiving circuit of FIG. 15 according to embodiments.

In some embodiments, CPR system 1500 further includes a clock. A sample clock 1898 is shown in FIG. 18 within choice controller 1819. However implemented, the clock can be configured to generate time inputs. In such embodiments, receiving circuit 1577 can be configured to thus select one of first battery 1561 and second battery 1562 according to the time inputs.

In some embodiments, receiving circuit 1577 is configured to monitor a first voltage V1 of first battery 1561, and a second voltage V2 of second battery 1562. Sample first and second voltages V1, V2 are shown in FIG. 18. In FIG. 15, where battery wires 1546, 1536 are indeed provided, first and second voltages V1, V2 can be monitored from these battery wires 1546, 1536, if they are permitted to be different by including more components in receiving circuit 1577 than central node 1599.

In such embodiments, receiving circuit 1577 can be configured to thus select one of first battery 1561 and second battery 1562 according to the monitored first voltage V1 and the monitored second voltage V2. If user interface 1578 is indeed provided, it can be configured to further output a human-perceptible indication representing at least one or both of the monitored first voltage V1 and the monitored second voltage V2. This would further help the rescuer in choosing to replace the battery desired at the time, which would often be the more depleted battery.

In some embodiments, CPR system 1500 further includes a communications module 1579, which can be adapted for wireless or wired communication. Communications module 1579 can be configured to output data that encodes at least one or both of the monitored first voltage V1 and the monitored second voltage V2. This data can then be received by a device of the rescuer such as a mobile device, a tablet Personal Computer (PC), or a remote server.

In some embodiments, receiving circuit 1577 selects one of batteries 1561, 1562, so as to preferentially draw from the battery that is already the least charged. By selecting this way, receiving circuit 1577 preserves the battery that is the best charged for when the rescuer will be replacing the battery with the least charge. Examples are now described.

Figure 17:
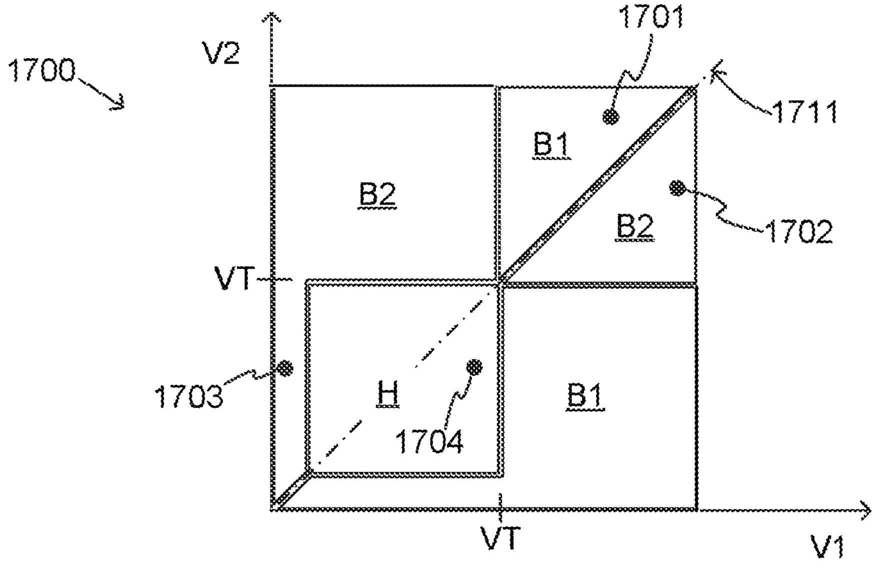
FIG. 17 is a sample decision diagram for a receiving circuit such as the receiving circuit of FIG. 15 according to an embodiment.

FIG. 17 is a sample decision diagram 1700 for the selections of receiving circuit of FIG. 15 according to an embodiment. Decision diagram 1700 shows domains of possible voltages (V1, V2), and indicates selections made for points in those domains. In decision diagram 1700, a diagonal line 1711 helps by separating the domains in values where V1>V2 (lower right) from values where V2>V1 (upper left).

For one example, as illustrated by point 1701 in decision diagram 1700, the receiving circuit can be configured to select the first battery (B1) over the second battery (B2) if first voltage V1 is less than second voltage V2. Point 1702 in decision diagram 1700 illustrates the inverse decision.

For another example, as again illustrated by point 1701 in decision diagram 1700, the receiving circuit can be configured to select the first battery (B1) over the second battery (B2) if first voltage V1 is less than second voltage V2, as long as first voltage V1 is higher than a threshold voltage VT. This is also illustrated by point 1703, in which first voltage V1 is again less than second voltage V2, but first voltage V1 is less than threshold voltage VT, in which case the second battery (B2) is selected.

Of course, once a selection is made, as time goes one the point may shift, given that the batteries may be drained. Where the selected battery is being drained preferentially over the unselected battery, the operative point (V1,V2), may migrate enough to where it enters a different domain, and the selected battery changes. For example, rules such as the above could create a space H in decision diagram 1700, whose selection could be made by hysteresis, i.e. the previous selection still holds. This can be the case for point 1704, for example, whose selection can be either the first battery B1 or the second B2, depending on which battery was being drawn from at the time domain H was entered.

Threshold voltage VT can be very small, and could be zero. In fact, the receiving circuit could be configured to select the first battery over the second battery if second voltage V2 is zero. Second voltage V2 could indeed be zero while the second battery is being replaced.

A receiving circuit can be made in a number of ways. One such way is described in U.S. Pat. No. 5,640,078 from a different art, and which is incorporated herein by reference. Another such way is now described.

FIG. 18 is a block diagram of sample components for implementing a receiving circuit 1877. Receiving circuit 1877 is electrically coupled with a first battery 1861 via a battery wire 1846, with a second battery 1862 via a battery wire 1836, and with a motor 1849 via a wire 1894 that includes a node 1899.

Receiving circuit 1877 also includes a first switching circuit 1811 that is electrically coupled to first battery 1861, and a second switching circuit 1812 that is electrically coupled to second battery 1862. Switching circuits 1811 1812 can be made using electrical components like transistors, Field Effect Transistors, etc.

Receiving circuit 1877 also includes a first battery voltage monitor 1881 configured to monitor first voltage V1, and a second battery voltage monitor 1882 configured to monitor second voltage V2. Battery voltage monitors 1881, 1882 are preferably implemented with a high input impedance.

Receiving circuit 1877 includes a choice controller 1819, which may optionally have a clock 1898. Choice controller 1819 may be implemented by a logic device such as a microprocessor, a programmable logic device, etc. Choice controller 1819 can be configured to receive inputs about monitored first voltage V1 and monitored second voltage V2 from battery voltage monitors 1881, 1882. In that case, battery voltage monitors 1881, 1882 could have an A/D converter, or could include a comparator for the threshold voltage VT of FIG. 17, and so on.

Choice controller 1819 can be configured to control first switching circuit 1811 and second switching circuit 1812 responsive to monitored first voltage V1 and monitored second voltage V2. Such controlling can be so as to enable one of first battery 1861 and second battery 1862 to provide power to motor 1849 preferentially over the other. Choice controller 1819 thus selects one of first battery 1861 and second battery 1862 preferentially over the other.

In some of these embodiments, first battery voltage monitor 1881 is configured to set a replace flag, responsive to sensing that monitored first voltage V1 is below a replace threshold. In such embodiments, a user interface such as user interface 1578 can be configured to output a human-perceptible indication responsive to the replace flag being set. This way the rescuer would know to replace first battery 1861 with a freshly charged one.

Embodiments of methods for a Cardio-Pulmonary Resuscitation (CPR) system are now described. Such a CPR system may include a retention structure, a compression mechanism, a motor, a first battery storing energy, a second battery storing energy, and a receiving circuit electrically coupled to the motor, to the first battery and to the second battery. Such a method comprises selecting, by the receiving circuit, one of the first battery and the second battery over the other; and permitting, by the receiving circuit, the motor to receive energy from the one of the first battery and the second battery that has been thus selected preferentially over the other, so as to drive the compression mechanism.

In some versions, in the method of the previous paragraph the CPR system is used for caring for a patient, the retention structure retains a body of the patient, and the compression mechanism, when thus driven, performs automatically CPR compressions alternating with releases to a chest of the patient, the CPR compressions thus causing the chest to become compressed by at least 2.5 cm.

Figure 19:
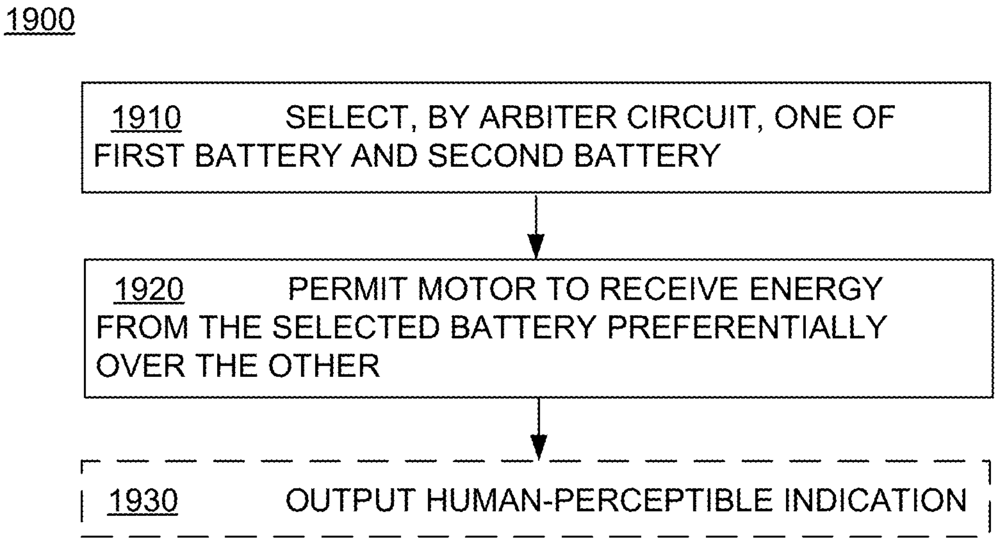
FIG. 19 is a flowchart for illustrating methods according to embodiments.

FIG. 19 shows a flowchart 1900 for describing methods according to embodiments. These methods maybe implemented by what is described above.

According to an operation 1910, one of a first battery and a second battery of a CPR system is selected over the other by a receiving circuit. In some embodiments, time inputs are further generated by a clock, and the selecting of operation 1910 is performed according to the time inputs. In some embodiments, a first voltage V1 of the first battery is monitored, a second voltage V2 of the second battery is monitored, and the selecting of operation 1910 is performed according to the monitored first voltage V1 and the monitored second voltage V2. The selection can be according to rules described above.

According to another operation 1920, a motor of the CPR system is permitted, by the receiving circuit, to receive energy from the selected one of the first battery and the second battery preferentially over the other. Such receiving of energy enables driving a compression mechanism to perform automatically CPR compressions alternating with releases to a chest of the body, the CPR compressions thus causing the chest to become compressed by at least 2.5 cm.

According to another, optional operation 1930, a human-perceptible indication may be output. The human-perceptible indication may indicate which one of the first battery and the second battery was selected at operation 1910. Or it may indicate that a replace flag is set, which may happen if the monitored first voltage is below a replace threshold.

In the methods described above, each operation can be performed as an affirmative step of doing, or causing to happen, what is written that can take place. Such doing or causing to happen can be by the whole system or device, or just one or more components of it. It will be recognized that the methods and the operations may be implemented in a number of ways, including using systems, devices and implementations described above. In addition, the order of operations is not constrained to what is shown, and different orders may be possible according to different embodiments. Examples of such alternate orderings may include overlapping, interleaved, interrupted, reordered, incremental, preparatory, supplemental, simultaneous, reverse, or other variant orderings, unless context dictates otherwise. Moreover, in certain embodiments, new operations may be added, or individual operations may be modified or deleted. The added operations can be, for example, from what is mentioned while primarily describing a different system, apparatus, device or method.

A person skilled in the art will be able to practice the disclosed technology in view of this description, which is to be taken as a whole. Details have been included to provide a thorough understanding. In other instances, well-known aspects have not been described, in order to not obscure unnecessarily this description. Plus, any reference to any prior art in this description is not, and should not be taken as, an acknowledgement or any form of suggestion that such prior art forms parts of the common general knowledge in any country or any art.

This description includes one or more examples, but this fact does not limit how the disclosed technology may be practiced. Indeed, examples, instances, versions or embodiments of the disclosed technology may be practiced according to what is described, or yet differently, and also in conjunction with other present or future technologies. Other such embodiments include combinations and sub-combinations of features described herein, including for example, embodiments that are equivalent to the following: providing or applying a feature in a different order than in a described embodiment; extracting an individual feature from one embodiment and inserting such feature into another embodiment; removing one or more features from an embodiment; or both removing a feature from an embodiment and adding a feature extracted from another embodiment, while providing the features incorporated in such combinations and sub-combinations.

In this document, the phrases "constructed to" and/or "configured to" denote one or more actual states of construction and/or configuration that is fundamentally tied to physical characteristics of the element or feature preceding these phrases and, as such, reach well beyond merely describing an intended use. Any such elements or features can be implemented in a number of ways, as will be apparent to a person skilled in the art after reviewing the present disclosure, beyond any examples shown in this document.

Any and all parent, grandparent, great-grandparent, etc. patent applications, whether mentioned in this document or in an Application Data Sheet ("ADS") of this patent application, are hereby incorporated by reference herein as originally disclosed, including any priority claims made in those applications and any material incorporated by reference, to the extent such subject matter is not inconsistent herewith. This disclosure, which may be referenced elsewhere as "3358", is meant to be illustrative and not limiting on the scope of the following claims.

In this description a single reference numeral may be used consistently to denote a single item, aspect, component, or process. Moreover, a further effort may have been made in the drafting of this description to use similar though not identical reference numerals to denote other versions or embodiments of an item, aspect, component or process that are identical or at least similar or related. Where made, such a further effort was not required, but was nevertheless made gratuitously so as to accelerate comprehension by the reader. Even where made in this document, such a further effort might not have been made completely consistently for all of the versions or embodiments that are made possible by this description. Accordingly, the description controls in defining an item, aspect, component or process, rather than its reference numeral. Any similarity in reference numerals may be used to infer a similarity in the text, but not to confuse aspects where the text or other context indicates otherwise.

The claims of this document define certain combinations and subcombinations of elements, features and steps or operations, which are regarded as novel and non-obvious. Additional claims for other such combinations and subcombinations may be presented in this or a related document. These claims are intended to encompass within their scope all changes and modifications that are within the true spirit and scope of the subject matter described herein. The terms used herein, including in the claims, are generally intended as "open" terms. For example, the term "including" should be interpreted as "including but not limited to," the term "having" should be interpreted as "having at least," etc. If a specific number is ascribed to a claim recitation, this number is a minimum but not a maximum unless stated otherwise. For example, where a claim recites "a" component or "an" item, it means that it can have one or more of this component or item.

We claim:

1. A Cardio-Pulmonary Resuscitation (CPR) system that is usable by a rescuer to care for a patient, the CPR system comprising:

a retention structure including a central member, a leg, and a back plate, the central member configured to couple to the back plate via the leg, the retention structure further including an instrument locking component associated with a well of the retention structure;

a battery wire including a first end, a second end opposite the first end;

a battery configured to be supported by the retention structure and to electrically couple to the second end of the battery wire when the central member is coupled to the back plate, the battery further including an accessory locking component, in which inserting the battery into the well to a threshold distance permits the instrument locking component and the accessory locking component to engage with each other to prevent the inserted battery housing from sliding out of the well when a force is applied to the battery housing against the retention structure;

a motor attached to the central member, the motor configured to electrically couple to the first end of the battery wire and to receive energy from the battery via the battery wire when the central member is coupled to the back plate; and a compression mechanism attached to the central member and configured to be driven by the motor while the motor receives energy from the battery, wherein the leg includes a leg electrical contact that physically contacts and is electrically coupled to the second end of the battery wire, the back plate includes a back plate electrical contact, the battery is configured to be supported by the back plate and to electrically couple to the back plate electrical contact when supported, and the back plate electrical contact is configured to physically touch and electrically couple with the leg electrical contact when the back plate electrical contact is electrically coupled to the central member.

2. The CPR system of claim 1, further comprising a contact spring configured to compress when the back plate electrical contact is electrically coupled to the central member.

3. The CPR system of claim 1, in which the back plate includes the well.

4. The CPR system of claim 1, in which the leg includes the well.

5. The CPR system of claim 1, in which one of the instrument locking component and the accessory locking component includes a release handle, and when the release handle is actuated, the engaged instrument locking component and accessory locking component are disengaged from each other to allow the battery to slide out of the well.

6. The CPR system of claim 1, in which the leg is a first leg and the retention structure further includes a second leg, and the central member is configured to couple to the back plate via the second leg.

7. The CPR system of claim 6, wherein the battery is a first battery, the CPR system further comprising a second battery supported by the second leg, the second battery configured to electrically couple to the motor.

8. A Cardio-Pulmonary Resuscitation (CPR) system that is usable by a rescuer to care for a patient, the CPR system comprising:

a retention structure including a central member, a leg, and a back plate, the central member configured to couple to the back plate via the leg, the retention structure including a first well and a second well and an instrument locking component associated with each well;

a motor attached to the central member;

a first battery wire including a first end, a second end opposite the first end;

a second battery wire including a first end, a second end of the second battery wire opposite the first end of the second battery wire;

a first battery supported by the retention structure and configured to be electrically coupled and provide energy to the motor when the central member is coupled to the back plate;

the first battery to electrically couple to the second end of the first battery wire when the central member is coupled to the back plate, a second battery supported by the retention structure and configured to be electrically coupled and to provide energy to the motor when the central member is coupled to the back plate, the second battery to electrically couple to the second end of the second battery wire when the central member is coupled to the back plate, each of the first battery and the second battery including an accessory locking component, in which inserting either the first battery or the second battery into the respective well to a threshold distance permits the instrument locking component and the accessory locking component to engage with each other to prevent the inserted battery housing from sliding out of the well when a force is applied to the battery housing against the back plate;

a receiving circuit electrically coupled to the first battery, the second battery, and the motor, the receiving circuit configured to prohibit the motor from receiving energy from one of the first battery and the second battery; and a compression mechanism attached to the central member and configured to be driven by the motor while the motor receives energy from at least one of the first battery and the second battery, wherein the leg includes a leg electrical contact that physically contacts and is electrically coupled to the second end of the first or second battery wire, the back plate includes a back plate electrical contact, the battery is configured to be supported by the back plate and to electrically couple to the back plate electrical contact when supported, and the back plate electrical contact is configured to physically touch and electrically couple with the leg electrical contact when the back plate electrical contact is electrically coupled to the central member.

9. The CPR system of claim 8, further comprising a contact spring configured to compress when the back plate electrical contact is electrically coupled to the central member.

10. The CPR system of claim 8, in which the back plate includes the first well and the second well.

11. The CPR system of claim 8, in which the leg is a first leg and the retention structure further includes a second leg, the first leg includes the first well and the second leg includes the second well.

12. The CPR system of claim 8, in which one of the instrument locking component and the accessory locking component includes a release handle, and when the release handle is actuated, the engaged instrument locking component and accessory locking component are disengaged from each other to allow the battery housing to slide out of the well.

13. The CPR system of claim 8, in which the leg is a first leg and the retention structure further includes a second leg, and the central member is configured to couple to the back plate via the second leg.

* * * * *